US00RE44855E

(19) United States
(12) Reissued Patent
Williams

(10) Patent Number: US RE44,855 E
(45) Date of Reissued Patent: Apr. 22, 2014

(54) MULTI-FUNCTIONAL CELLULAR TELEPHONE

(75) Inventor: Hilary L. Williams, Cambridge (GB)

(73) Assignee: Apple Inc., Cupertino, CA (US)

(21) Appl. No.: 13/188,239

(22) Filed: Jul. 21, 2011

Related U.S. Patent Documents

Reissue of:

(64) Patent No.: 6,956,564
Issued: Oct. 18, 2005
Appl. No.: 09/171,921
PCT Filed: Oct. 8, 1998
PCT No.: PCT/GB98/03016
§ 371 (c)(1),
(2), (4) Date: Oct. 29, 1998
PCT Pub. No.: WO99/22338
PCT Pub. Date: May 6, 1999

U.S. Applications:

(62) Division of application No. 11/907,832, filed on Oct. 17, 2007, now Pat. No. Re. 42,738, which is an application for the reissue of Pat. No. 6,956,564.

(51) Int. Cl.
*G06F 3/033* (2013.01)

(52) U.S. Cl.
USPC ..... 345/179; 455/410; 455/566; 455/575.1; 455/418; 455/550.1; 178/18.01; 178/18.03; 178/19.01; 178/19.04

(58) Field of Classification Search
USPC ..... 455/566, 410, 411, 550.1, 418, 575.1, 455/575.8; 345/179; 178/18.01, 18.03, 178/19.01, 19.04
See application file for complete search history.

(56) References Cited

U.S. PATENT DOCUMENTS

| | | | |
|---|---|---|---|
| 1,061,578 | A | 5/1913 | Wischhusen et al. |
| 2,798,907 | A | 7/1957 | Schneider |
| 2,945,111 | A | 7/1960 | McCormick |
| 3,005,055 | A | 10/1961 | Mattke |
| 3,509,298 | A | 4/1970 | Kirk |
| 3,662,105 | A | 5/1972 | Hurst et al. |
| 3,706,867 | A | 12/1972 | Rand et al. |
| 3,721,956 | A | 3/1973 | Hamann et al. |
| 3,790,727 | A | 2/1974 | Laserson et al. |
| 3,798,370 | A | 3/1974 | Hurst |

(Continued)

FOREIGN PATENT DOCUMENTS

| | | | |
|---|---|---|---|
| CN | 1139235 | A | 1/1997 |
| CN | 1455615 | A | 11/2003 |

(Continued)

OTHER PUBLICATIONS

U.S. ITC, In the Matter of Certain Portable Electronic Devices and Related Software: Order No. 57: Construing the Terms of the Asserted Claims of the Patents at Issue, Jun. 26, 2012, pp. 63-97.

(Continued)

*Primary Examiner* — Vladimir Magloire
(74) *Attorney, Agent, or Firm* — Novak Druce Connolly Bove + Quigg LLP

(57) ABSTRACT

A portable computer arranged to rest comfortably in the hand has a small display screen. Accelerometers capable of detecting movement of the pen with respect to gravity provide input to a microcontroller which selects a response from a number of viewing modes. The pen may be held in either hand and the output message to the screen will be oriented according to the location of the pen. Full personal digital assistance functionality may be incorporated in a relatively small plastics casing and functions, such as calendar, contracts the like may be incorporated.

31 Claims, 10 Drawing Sheets

(56) References Cited

U.S. PATENT DOCUMENTS 3,965,399 A 6/1976 Walker, Jr. et al.
4,070,649 A 1/1978 Wright, Jr. et al.
4,103,252 A 7/1978 Bobick
4,110,749 A 8/1978 Janko et al.
4,115,670 A 9/1978 Chandler
4,121,204 A 10/1978 Welch et al.
4,129,747 A 12/1978 Pepper, Jr.
4,158,216 A 6/1979 Bigelow
4,196,429 A 4/1980 Davis
4,242,676 A 12/1980 Piguet et al.
4,246,452 A 1/1981 Chandler
4,264,903 A 4/1981 Bigelow
4,293,734 A 10/1981 Pepper, Jr.
4,311,891 A 1/1982 Faust
4,380,007 A 4/1983 Steinegger
4,380,040 A 4/1983 Posset
4,449,193 A 5/1984 Tournois
4,475,008 A 10/1984 Doi et al.
4,484,346 A 11/1984 Sternberg et al.
4,513,183 A 4/1985 Hill
4,564,952 A 1/1986 Karabinis
4,570,149 A 2/1986 Thornburg et al.
4,587,378 A 5/1986 Moore
4,595,990 A * 6/1986 Garwin et al. ..... 708/141
4,628,160 A 12/1986 Canevari
4,644,100 A 2/1987 Brenner et al.
4,669,054 A 5/1987 Schlunt et al.
4,677,913 A 7/1987 Farace
4,719,524 A 1/1988 Morishima et al.
4,734,034 A 3/1988 Maness et al.
4,736,191 A 4/1988 Matzke et al.
4,739,299 A 4/1988 Eventoff et al.
4,746,770 A 5/1988 McAvinney
4,752,655 A 6/1988 Tajiri et al.
4,764,717 A 8/1988 Tucker et al.
4,783,829 A 11/1988 Miyakawa et al.
4,798,919 A 1/1989 Miessler et al.
4,810,992 A 3/1989 Eventoff
4,831,359 A 5/1989 Newell
4,833,281 A 5/1989 Maples
4,843,568 A 6/1989 Krueger et al.
4,847,789 A 7/1989 Kelly et al.
4,849,852 A 7/1989 Mullins
4,856,993 A 8/1989 Maness et al.
4,866,602 A 9/1989 Hall
4,876,524 A 10/1989 Jenkins
4,897,511 A 1/1990 Itaya et al.
4,899,956 A 2/1990 King et al.
4,912,662 A 3/1990 Butler et al.
4,914,624 A 4/1990 Dunthorn
4,917,516 A 4/1990 Retter
4,951,036 A 8/1990 Grueter et al.
4,969,180 A 11/1990 Watterson et al.
4,976,435 A 12/1990 Shatford et al.
4,990,900 A 2/1991 Kikuchi
5,008,497 A 4/1991 Asher
5,023,438 A 6/1991 Wakatsuki et al.
5,036,321 A 7/1991 Leach et al.
5,043,736 A 8/1991 Darnell et al.
5,053,757 A 10/1991 Meadows
5,063,526 A 11/1991 Kagawa et al.
5,133,076 A 7/1992 Hawkins et al.
5,159,159 A 10/1992 Asher
5,179,648 A 1/1993 Hauck
5,189,404 A 2/1993 Masino et al.
5,215,397 A 6/1993 Taguchi et al.
5,227,929 A 7/1993 Comerford
5,231,326 A 7/1993 Echols
5,237,311 A 8/1993 Mailey et al.
5,252,951 A 10/1993 Tannenbaum et al.
5,278,362 A 1/1994 Ohashi
5,301,222 A 4/1994 Fujiwara
5,305,017 A 4/1994 Gerpheide
5,313,027 A 5/1994 Inoue et al.
5,313,835 A 5/1994 Dunn
5,319,386 A 6/1994 Gunn et al.
5,329,289 A 7/1994 Sakamoto et al.
5,339,213 A 8/1994 O'Callaghan
5,345,543 A 9/1994 Capps et al.
5,345,824 A 9/1994 Sherman et al.
5,361,387 A 11/1994 Millar et al.
5,367,199 A 11/1994 Lefkowitz et al.
5,369,262 A 11/1994 Dvorkis et al.
5,374,787 A 12/1994 Miller et al.
5,396,265 A 3/1995 Ulrich et al.
5,398,310 A 3/1995 Tchao et al.
5,404,152 A 4/1995 Nagai
5,408,621 A 4/1995 Ben-Arie
5,414,445 A 5/1995 Kaneko et al.
5,416,498 A 5/1995 Grant
5,422,656 A 6/1995 Allard et al.
5,424,756 A 6/1995 Ho et al.
5,432,531 A 7/1995 Calder et al.
5,434,964 A 7/1995 Moss et al.
5,438,331 A 8/1995 Gilligan et al.
5,442,742 A 8/1995 Greyson et al.
D362,431 S 9/1995 Kaneko et al.
5,450,075 A 9/1995 Waddington
5,453,761 A 9/1995 Tanaka
5,463,696 A 10/1995 Beernink et al.
5,473,343 A 12/1995 Kimmich et al.
5,473,344 A 12/1995 Bacon et al.
5,477,237 A 12/1995 Parks
5,479,192 A 12/1995 Carroll, Jr. et al.
5,488,204 A 1/1996 Mead et al.
5,488,558 A 1/1996 Ohki
5,495,566 A 2/1996 Kwatinetz
5,508,703 A 4/1996 Okamura et al.
5,513,309 A 4/1996 Meier et al.
RE35,269 E 6/1996 Comerford
5,523,775 A 6/1996 Capps
5,528,265 A 6/1996 Harrison
5,537,608 A 7/1996 Beatty et al.
5,540,095 A 7/1996 Sherman et al.
5,543,588 A 8/1996 Bisset et al.
5,543,591 A 8/1996 Gillespie et al.
5,559,301 A 9/1996 Bryan, Jr. et al.
5,559,943 A 9/1996 Cyr et al.
5,561,445 A 10/1996 Miwa et al.
5,563,996 A 10/1996 Tchao
5,565,887 A 10/1996 McCambridge et al.
5,566,098 A 10/1996 Lucente et al.
5,570,109 A 10/1996 Jenson
5,578,817 A 11/1996 Bidiville et al.
5,581,670 A 12/1996 Bier et al.
5,581,681 A 12/1996 Tchao et al.
5,583,946 A 12/1996 Gourdol
5,585,823 A 12/1996 Duchon et al.
5,589,856 A 12/1996 Stein et al.
5,589,893 A 12/1996 Gaughan et al.
5,590,219 A 12/1996 Gourdol
5,592,566 A 1/1997 Pagallo et al.
5,592,572 A 1/1997 Le
5,594,776 A 1/1997 Dent
5,594,810 A 1/1997 Gourdol
5,598,183 A 1/1997 Robertson et al.
5,602,566 A 2/1997 Motosyuku et al.
5,611,060 A 3/1997 Belfiore et al.
5,612,719 A 3/1997 Beernink et al.
5,613,137 A 3/1997 Bertram et al.
5,615,132 A 3/1997 Horton et al.
5,615,384 A 3/1997 Allard et al.
5,616,384 A 4/1997 Goettmann et al.
5,617,114 A 4/1997 Bier et al.
5,626,430 A 5/1997 Bistrack
5,627,531 A 5/1997 Posso et al.
5,632,679 A 5/1997 Tremmel
5,640,258 A 6/1997 Kurashima et al.
5,656,804 A 8/1997 Barkan et al.
5,657,012 A 8/1997 Tait
5,661,632 A 8/1997 Register
5,670,985 A 9/1997 Cappels, Sr. et al.
5,677,710 A 10/1997 Thompson-Rohrlich
5,686,940 A 11/1997 Kuga ..... 345/156

(56) References Cited

U.S. PATENT DOCUMENTS 5,689,285 A 11/1997 Asher
5,702,323 A 12/1997 Poulton
5,708,804 A 1/1998 Goodwin et al.
5,715,524 A 2/1998 Jambhekar et al. ..... 455/575.3
5,726,672 A 3/1998 Hernandez et al.
5,726,687 A 3/1998 Belfiore et al.
5,729,219 A 3/1998 Armstrong et al.
5,729,249 A 3/1998 Yasutake
5,729,604 A 3/1998 Van Schyndel
5,734,371 A 3/1998 Kaplan
5,734,875 A 3/1998 Cheng
5,739,451 A 4/1998 Winksy et al.
5,745,116 A 4/1998 Pisutha-Arnond
5,748,185 A 5/1998 Stephan et al.
5,751,274 A 5/1998 Davis
5,753,983 A 5/1998 Dickie et al.
5,754,645 A 5/1998 Metroka et al.
5,754,890 A 5/1998 Holmdahl et al.
5,758,267 A 5/1998 Pinder et al.
5,777,605 A 7/1998 Yoshinobu et al.
5,781,630 A 7/1998 Huber et al.
5,786,789 A 7/1998 Janky
5,789,716 A 8/1998 Wang
5,790,769 A 8/1998 Buxton et al.
5,793,310 A 8/1998 Watanabe et al.
5,794,164 A 8/1998 Beckert et al.
5,798,750 A 8/1998 Ozaki
5,808,602 A 9/1998 Sellers
5,809,267 A 9/1998 Moran et al.
5,815,142 A 9/1998 Allard et al.
5,824,904 A 10/1998 Kouhei et al.
5,825,351 A 10/1998 Tam
5,825,353 A 10/1998 Will
5,825,675 A 10/1998 Want et al.
5,828,364 A 10/1998 Siddiqui
5,835,061 A 11/1998 Stewart
5,835,083 A 11/1998 Nielsen et al.
5,835,732 A 11/1998 Kikinis et al.
5,841,423 A 11/1998 Carroll, Jr. et al.
5,847,280 A 12/1998 Sherman et al.
5,847,698 A 12/1998 Reavey et al.
5,848,373 A 12/1998 DeLorme
5,850,213 A 12/1998 Imai et al.
5,856,822 A 1/1999 Du et al.
5,859,629 A 1/1999 Tognazzini
5,874,941 A 2/1999 Yamada
5,874,942 A 2/1999 Walker
5,875,257 A 2/1999 Marrin et al.
5,875,311 A 2/1999 Bertram et al.
5,880,411 A 3/1999 Gillespie et al.
5,883,619 A 3/1999 Ho et al.
5,884,156 A 3/1999 Gordon
5,889,236 A 3/1999 Gillespie et al.
5,889,511 A 3/1999 Ong et al.
5,900,863 A 5/1999 Numazaki
5,902,968 A 5/1999 Sato et al.
5,903,229 A 5/1999 Kishi
5,906,657 A 5/1999 Tognazzini
5,907,130 A 5/1999 Suzuki
5,907,152 A 5/1999 Dandliker et al.
5,907,318 A 5/1999 Medina
5,909,207 A 6/1999 Ho
5,909,211 A 6/1999 Combs et al.
5,910,797 A 6/1999 Beuk
5,910,800 A 6/1999 Sheilds et al.
5,910,882 A 6/1999 Burrell
5,914,706 A 6/1999 Kono
5,914,882 A 6/1999 Yeghiazarians
5,923,388 A 7/1999 Kurashima et al.
5,923,757 A 7/1999 Hocker et al.
5,923,861 A * 7/1999 Bertram et al. ..... 715/786
5,933,778 A 8/1999 Buhrmann et al.
5,943,044 A 8/1999 Martinelli et al.
5,946,376 A 8/1999 Cistulli
5,949,408 A 9/1999 Kang et al.
5,953,001 A 9/1999 Challener et al.
5,955,712 A 9/1999 Zakutin
5,956,019 A 9/1999 Bang et al.
5,956,626 A 9/1999 Kaschke et al.
5,959,611 A 9/1999 Smailagic et al.
5,966,680 A * 10/1999 Butnaru ..... 702/150
5,973,668 A 10/1999 Watanabe
5,973,915 A 10/1999 Evans
5,982,573 A 11/1999 Henze
5,986,634 A 11/1999 Alioshin et al.
5,991,085 A 11/1999 Rallison et al.
5,996,080 A 11/1999 Silva et al.
6,002,389 A 12/1999 Kasser
6,002,808 A 12/1999 Freeman
6,002,963 A 12/1999 Mouchawar et al.
6,005,299 A 12/1999 Hengst
6,009,336 A 12/1999 Harris et al.
6,011,585 A 1/2000 Anderson
6,016,135 A 1/2000 Biss et al.
6,020,891 A 2/2000 Rekimoto
6,025,832 A 2/2000 Sudo et al.
6,031,518 A 2/2000 Adams et al.
6,031,600 A 2/2000 Winner et al.
6,034,672 A 3/2000 Gaultier et al.
6,041,023 A 3/2000 Lakhansingh
6,044,299 A 3/2000 Nilsson
6,046,877 A 4/2000 Kelsic
6,057,829 A 5/2000 Silfvast
6,072,494 A 6/2000 Nguyen
6,073,036 A 6/2000 Heikkinen et al.
6,075,533 A 6/2000 Chang
6,083,353 A 7/2000 Alexander, Jr.
6,084,574 A 7/2000 Bidiville
6,084,594 A 7/2000 Goto
6,085,112 A * 7/2000 Kleinschmidt et al. .... 455/556.1
6,091,956 A 7/2000 Hollenberg
6,097,372 A 8/2000 Suzuki
6,108,426 A 8/2000 Stortz
6,115,025 A 9/2000 Buxton et al.
6,115,620 A 9/2000 Colonna et al. ..... 455/569.1
6,122,526 A 9/2000 Parulski et al.
6,124,587 A 9/2000 Bidiville et al.
6,128,003 A 10/2000 Smith et al.
6,128,006 A 10/2000 Rosenberg et al.
6,130,663 A 10/2000 Null
6,130,666 A 10/2000 Persidsky
6,137,468 A 10/2000 Martinez et al. ..... 345/649
6,137,481 A 10/2000 Phillipps
6,141,014 A 10/2000 Endo et al.
6,144,380 A 11/2000 Shwarts et al.
6,148,261 A 11/2000 Obradovich et al.
6,157,935 A 12/2000 Tran et al.
6,163,312 A 12/2000 Furuya
6,166,721 A 12/2000 Kuroiwa et al.
6,169,911 B1 1/2001 Wagner et al.
6,181,322 B1 1/2001 Nanavati
6,185,485 B1 2/2001 Ashrafi et al.
6,188,391 B1 2/2001 Seely et al.
6,188,392 B1 2/2001 O'Connor et al.
6,188,393 B1 2/2001 Shu
6,191,774 B1 2/2001 Schena et al.
6,198,473 B1 3/2001 Armstrong
6,199,045 B1 3/2001 Giniger et al.
6,199,874 B1 3/2001 Galvin et al.
6,202,060 B1 3/2001 Tran
6,219,038 B1 4/2001 Cho
6,225,976 B1 5/2001 Yates et al.
6,225,980 B1 5/2001 Weiss et al.
6,227,966 B1 5/2001 Yokoi
6,243,074 B1 6/2001 Fishkin
6,243,075 B1 6/2001 Fishkin et al.
6,243,080 B1 6/2001 Molne
6,256,011 B1 7/2001 Culver
6,259,405 B1 7/2001 Stewart et al.
6,262,717 B1 7/2001 Donohue et al.
6,266,050 B1 7/2001 Oh et al.
6,268,857 B1 7/2001 Fishkin et al.
6,278,884 B1 8/2001 Kim
6,297,795 B1 10/2001 Kato et al.

(56) References Cited

U.S. PATENT DOCUMENTS

| | | | | |
|---|---|---|---|---|
| 6,297,805 | B1 | 10/2001 | Adler et al. | |
| 6,297,838 | B1 | 10/2001 | Change et al. | |
| 6,308,134 | B1 | 10/2001 | Croyle et al. | |
| 6,323,845 | B1 | 11/2001 | Robbins | |
| 6,323,846 | B1 | 11/2001 | Westerman et al. | |
| 6,330,149 | B1 | 12/2001 | Burrell | |
| 6,335,727 | B1 | 1/2002 | Morishita et al. | |
| 6,340,957 | B1 | 1/2002 | Adler et al. | |
| 6,347,290 | B1 | 2/2002 | Bartlett | |
| 6,373,612 | B1 | 4/2002 | Hoffman et al. | |
| 6,380,931 | B1 | 4/2002 | Gillespie et al. | |
| 6,407,846 | B1 | 6/2002 | Myers et al. | |
| 6,414,671 | B1 | 7/2002 | Gillespie et al. | |
| 6,429,852 | B1 | 8/2002 | Adams et al. | |
| 6,459,424 | B1 | 10/2002 | Resman | |
| 6,473,069 | B1 | 10/2002 | Gerpheide | |
| 6,496,181 | B1 | 12/2002 | Bomer et al. | |
| 6,567,068 | B2 | 5/2003 | Rekimoto | 345/156 |
| 6,567,102 | B2 | 5/2003 | Kung | |
| 6,573,883 | B1 | 6/2003 | Bartlett | |
| 6,597,817 | B1 | 7/2003 | Silverbrook | |
| 6,610,936 | B2 | 8/2003 | Gillespie et al. | |
| 6,624,824 | B1 | 9/2003 | Tognazzini et al. | |
| 6,681,120 | B1 | 1/2004 | Kim | |
| 6,686,910 | B2 | 2/2004 | O'Donnell, Jr. | |
| RE38,471 | E | 3/2004 | Howard et al. | |
| 6,734,845 | B1 | 5/2004 | Nielsen et al. | |
| 6,747,692 | B2 | 6/2004 | Patel et al. | |
| 6,809,724 | B1 | 10/2004 | Shiraishi | |
| 6,822,634 | B1 | 11/2004 | Kemp et al. | |
| 6,888,536 | B2 | 5/2005 | Westerman et al. | |
| 6,920,619 | B1 | 7/2005 | Milekic | |
| 6,931,309 | B2 | 8/2005 | Phelan et al. | |
| RE38,896 | E | 11/2005 | Anderson | |
| 6,999,779 | B1 * | 2/2006 | Hashimoto | 455/456.2 |
| 7,184,796 | B2 | 2/2007 | Karidis et al. | |
| RE42,738 | E | 9/2011 | Williams | |
| 2002/0015024 | A1 | 2/2002 | Westerman et al. | |
| 2002/0152045 | A1 | 10/2002 | Dowling et al. | |
| 2003/0076343 | A1 | 4/2003 | Fishkin et al. | |
| 2006/0061551 | A1 | 3/2006 | Fateh | |
| 2006/0156249 | A1 | 7/2006 | Blythe et al. | |
| 2011/0025912 | A1 | 2/2011 | Regler | |

FOREIGN PATENT DOCUMENTS

| | | | | |
|---|---|---|---|---|
| DE | 3615742 | A1 | 11/1987 | |
| DE | 4434773 | A1 | 4/1996 | |
| DE | 4445023 | A1 | 6/1996 | |
| DE | 19722636 | A1 | 12/1998 | |
| DE | 10022537 | A1 | 11/2000 | |
| EP | 0178157 | | 4/1986 | |
| EP | 0498540 | A2 | 8/1992 | |
| EP | 0658894 | | 6/1995 | |
| EP | 0674288 | A1 | 9/1995 | |
| EP | 0731407 | A1 | 9/1996 | |
| EP | 0551778 | B1 | 1/1997 | |
| EP | 0757437 | A2 | 2/1997 | |
| EP | 0880091 | A2 | 11/1998 | |
| EP | 0917077 | A2 | 5/1999 | |
| EP | 0982732 | A1 | 3/2000 | |
| EP | 1026713 | A1 | 8/2000 | |
| EP | 1028425 | A2 | 8/2000 | |
| FR | 2686440 | A1 | 7/1993 | |
| GB | 2072389 | | 9/1981 | |
| GB | 2315186 | A | 1/1998 | |
| GB | 2448319 | A | 10/2008 | |
| JP | 61117619 | A2 | 6/1986 | |
| JP | 61124009 | A2 | 6/1986 | |
| JP | 63106826 | A2 | 5/1988 | |
| JP | 63181022 | A2 | 7/1988 | |
| JP | 63298518 | A2 | 12/1988 | |
| JP | 04032920 | A | 2/1992 | |
| JP | 05041135 | A2 | 2/1993 | |
| JP | 05080938 | A2 | 4/1993 | |
| JP | 05101741 | A2 | 4/1993 | |
| JP | 05189110 | A2 | 7/1993 | |
| JP | 05205565 | A2 | 8/1993 | |
| JP | 05211021 | A2 | 8/1993 | |
| JP | 05217464 | A2 | 8/1993 | |
| JP | 05233141 | A | 9/1993 | |
| JP | 05265656 | A2 | 10/1993 | |
| JP | 05274956 | A2 | 10/1993 | |
| JP | 05289811 | A | 11/1993 | |
| JP | 05298955 | A2 | 11/1993 | |
| JP | 05325723 | A2 | 12/1993 | |
| JP | 06089636 | A2 | 3/1994 | |
| JP | 06096639 | A2 | 4/1994 | |
| JP | 06111685 | A2 | 4/1994 | |
| JP | 06111695 | A2 | 4/1994 | |
| JP | 06139879 | A2 | 5/1994 | |
| JP | 06187078 | A | 7/1994 | |
| JP | 06208433 | A | 7/1994 | |
| JP | 06267382 | A2 | 9/1994 | |
| JP | 06283993 | A2 | 10/1994 | |
| JP | 06333459 | A2 | 12/1994 | |
| JP | 07107574 | A2 | 4/1995 | |
| JP | 07201249 | A2 | 8/1995 | |
| JP | 07201256 | A | 8/1995 | |
| JP | 07253838 | A2 | 10/1995 | |
| JP | 07261899 | A2 | 10/1995 | |
| JP | 07261922 | A2 | 10/1995 | |
| JP | 7287689 | | 10/1995 | |
| JP | 07296670 | A | 11/1995 | |
| JP | 07319001 | A2 | 12/1995 | |
| JP | 08016292 | A2 | 1/1996 | |
| JP | 08115158 | A2 | 5/1996 | |
| JP | 08203387 | A2 | 8/1996 | |
| JP | 08293226 | A2 | 11/1996 | |
| JP | 08298045 | A2 | 11/1996 | |
| JP | 08299541 | A2 | 11/1996 | |
| JP | 08316664 | A2 | 11/1996 | |
| JP | 09044289 | A2 | 2/1997 | |
| JP | 09069023 | A2 | 3/1997 | |
| JP | 09128148 | A2 | 5/1997 | |
| JP | 09218747 | A2 | 8/1997 | |
| JP | 09230993 | A2 | 9/1997 | |
| JP | 09231858 | A2 | 9/1997 | |
| JP | 09251347 | A2 | 9/1997 | |
| JP | 09288926 | A2 | 11/1997 | |
| JP | 10074429 | A2 | 3/1998 | |
| JP | 10198507 | A2 | 7/1998 | |
| JP | 10227878 | A2 | 8/1998 | |
| JP | 10326149 | A2 | 12/1998 | |
| JP | 11184607 | A2 | 7/1999 | |
| JP | 11194863 | A2 | 7/1999 | |
| JP | 11194872 | A2 | 7/1999 | |
| JP | 11194882 | A2 | 7/1999 | |
| JP | 11194883 | A2 | 7/1999 | |
| JP | 11194891 | A2 | 7/1999 | |
| JP | 11195353 | A2 | 7/1999 | |
| JP | 11203045 | A2 | 7/1999 | |
| WO | WO 94/17494 | | 8/1994 | |
| WO | WO 95/00897 | | 1/1995 | |
| WO | 95/04327 | | 2/1995 | |
| WO | WO96/35288 | * | 7/1996 | H04B 1/38 |
| WO | WO 98/14863 | | 4/1998 | |
| WO | 99/22338 | | 5/1999 | |
| WO | WO 99/38149 | | 7/1999 | |
| WO | WO 99/49443 | | 9/1999 | |
| WO | 2005/052773 | | 6/2005 | |

OTHER PUBLICATIONS

Jun Rekimoto, "Tilting Operations for Small Screen Interfaces (Tech Note)," 1996.

Z. Szalavari; and M. Gervautz; "The Personal Interaction Panel—A Two- Handed Interface for Augmented Reality," Computer Graphics Forum, Sep. 1997, pp. C335-C346, vol. 16, No. 3.

Apple, Newton—Apple MessagePad Handbook, 1995, pp. 1-358.

Newton MessagePad 2000 User's Manual, pp. 1-278 (1997).

Kenneth P. Fishkin; Thomas P. Moran; and Beverly L. Harrison; "Embodied User Interfaces: Towards Invisible User Interfaces," Proceedings of EHCI 98, (Heraklion, Crete, Sep. 13-18, 1998.

(56) References Cited

OTHER PUBLICATIONS

Steve Nasiri; Shang-Hung Lin; Davids Sachs; and Joseph Jiang; "Motion Processing: The Next Breakthrough Function in Handsets," Mobile Dev&Design, 2010, pp. 1-10.
Lynellen D.S. Perry; Christopher M. Smith; and Steven Yang; "An Investigation of Current Virtual Reality Interfaces," Crossroads The ACM Student Magazine, Mar. 1992.
G.W. Fitzmaurice, "Situated Information Spaces and Spatially Aware Palmtop Computers," Communications of the ACM, Jul. 1993, pp. 39-49, vol. 36, No. 7.
R. Azuma; and G. Bishop; "Improving Static and Dynamic Registration in an Optical See-through HMD," SIGGRAPH 94, Jul. 24-29, 1994, Orlando, Florida.
E. Foxlin; M. Harrington; and G. Pfeifer; "Constellation: A Wide-Range Wireless Motion-Tracking System for Augmented Reality and Virtual Set Applications," Proceedings of SIGGRAPH 98, Jul. 19-24, 1998, Orlando, Florida.
T.W. Bleser; J.L. Sibert; and J.P. McGee, "Charcoal Sketching: Returning Control to the Artist," The Interaction Technique Notebook, 1988.
D. Small; and H. Ishii, "Design of Spatially Aware Graspable Displays," CHI 97, Mar. 22-27, 1997, pp. 367-368.
M.A. Viredaz, WRL Technical Note TN-54—The Memory Daughter-Card Version 1.5 User's Manual, Jul. 1998.
M.A. Viredaz, WRL Technical Note TN-55—The Itsy Pocket Computer Version 1.5 User's Manual, Jul. 1998.
Bartlett et al., WRL Research Report 2000/6—The Itsy Pocket Computer, Oct. 2000.
K. Kawachiya and H. Ishikawa, "NaviPoint: An Input Device for Mobile Information Browsing," CHI '98, Apr. 18-23, 1998.
G. Levin; and P. Yarin, "Bringing Sketching Tools to Keychain Computers with an Acceleration-Based Interface," Proceedings of CHI1998 Extended Abstracts, ACM, New York, 1998, pp. 268-269.
A. Schmidt; M. Beigl; and H.W. Gellerson; "There is More to Context than Location," 1998.
Want et al., "An Overview of the PARCTAB Ubiquitous Computing Experiment," IEEE Personal Communications, Dec. 1995, pp. 28-43.
di Massimo Truscelli, "Radius Full Page Pivot," MCmicrocomputer, Apr. 1992, No. 117, pp. 136-140.
G.W. Fitzmaurice; S. Zhai; and M.H. Chignell, "Virtual Reality for Palmtop Computers," ACM Transactions on Information Systems, Jul. 1993, pp. 197-218, vol. 11, No. 3.
W.A. Hoff; K. Nguyen; and T. Lyon, "Computer Vision-Based Registration Techniques for Augmented Reality," 1996.
J. Woodfill and B. Von Herzen, "Real-Time Stereo Vision on the Parts Reconfigurable Computer," 1997.
R. Holloway and A. Lastra; "Virtual Environments: A Survey of the Technology," 1993.
A.L. Zwern and G.L. Goodrich, "Virtual Computer Monitor for Visually-Impaired Users," 1996.
G.F. Welch, "Hybrid Self-Tracker: An Inertial/Optical Hybrid Three-Dimensional Tracking System," 1995.
Geoff Walker, "Touch screen highlights from the SID 2006 show floor," Jun. 2006, pp. 19-26.
Geoff Walker, "A Cornucopia of Touch Technology," 2006.
J.F. Bartlett, "Rock 'n' Scroll is here to stay [user interface]," Computer Graphics and Applications, IEEE, May/Jun. 2000, vol. 20, Issue 3.
B.L. Harrison; K.P. Fishkin; A. Gujar; C. Mochon; and R. Want, "Squeeze Me, Hold Me, Tilt Me! An Exploration of Manipulative User Interfaces," CHI '98, Los Angeles, CA USA, Apr. 1998, pp. 17-24.
G. Kurtenbach; G. Fitzmaurice; T. Baudel; and B. Buxton, "The Design of a GUI Paradigm based on Tablets, Two-hands, and Transparency," CHI '97, Mar. 22-27, 1997.
C. Kitchin, Using Accelerometers in Low g Applications, Analogue Devices Application Note AN-374, 1995.
E. Foxlin and N. Durlach, An Inertial Head-Orientation Tracker With Automatic Drift Compensation for Use With HMDs, VRST 94, Singapore, Aug. 23-26, 1994.
B. MacIntyre and S. Feiner, Future Multimedia User Interfaces, 1996.
Verplaetse, "Inertial Proprioceptive Devices—Self-Motion-Sensing Toys and Tools," IBM Systems Journal, 1996, pp. 639-650, vol. 35, Nos. 3 & 4, C.
I. Sutherland, "A Head Mounted Three Dimensional Display," proceedings FJCC 1968.
J. H. Bohn, "Computer Aided Design I," 1997.
"Frontiers of Engineering, Reports on Leading Edge Engineering from the 1996 NAE Symposium on Frontiers of Engineering," 1997.
Helms et al., "Virtual Environment Technology for MOUT Training," 1997.
G.A. Henault, "A Computer Simulation Study and Component Evaluation for a Quaternion Filter for Sourceless Tracking of Human Limb Segment Motion," 1997.
"Advanced Technology for Portable Personal Visualization," 1992.
J.D. Foley; A. Van Dam; and S.K. Feiner, "Computer Graphics Principles and Practice," 1995.
"Kitchen Computer IBM Technical Disclosure Bulletin," 1994, pp. 223-225, vol. 37, No. 12.
J.H. Bohn, Computer-Aided Design I—Term Papers, 1997.
"Image Orientation Sensing and Correction for Notepads," Research Disclosure No. 34788, 1993, p. 217.
Analog Devices, Inc., Analog Devices—Programmable Capacitance-to-Digital Converter with Environmental Compensation, 2005.
Meyer, H.U.; Sylvac SA, Crissier; "An Integrated Capacitive Position Sensor," Instrumentation and Measurement Technology Conference, IMTC/95.Proceedings. 'Integrating Intelligent Instrumentation and Control'., IEEE, 1995.
D. Strickland; A. Patel; C. Stovall; J. Palmer; and D. McCalister, Self Tracking of Human Motion for Virtual Reality Systems, 1994, pp. 8-10.
Computer Graphics Forum, 1995, pp. 29-41, vol. 14, Issue 3.
P.A. Millman; M. Stanley; and J.E. Colgate, Design of a High Performance Haptic Interface to Virtual Environments, Virtual Reality Annual International Symposium, 1993.
D. Kim; S.W. Richards; and T.P. Caudell, An Optical Tracker for Augmented Reality, Virtual Reality Annual International Symposium, 1997.
Second Annual Symposium on the Frontiers of Engineering, National Academies Press 1997.
M. Kruger, Addition of Olfactory Stimuli to Virtual Reality Simulations for Medical Training Application, 1996.
T. Higgins; P. Main; and J. Lang, Imaging the Past: Electronic Imaging and Computer Graphics in Museums and Archaeology, 1997.
Proceedings on the First International Symposium of Wearable Computers, IEEE, 1997.
M.W. Kruger, Artificial Reality, 1983.
M.W. Kruger, Artificial Reality II, 1991.
L. Borman and B. Curtis, Human Factors in Computing Systems, CHI '85 Conference Proceedings, Apr. 14-18, 1985, San Francisco.
James D. Foley et al., Computer Graphics—Principles and Practice, 2nd Edition, 1990.
James D. Foley et al., Computer Graphics—Principles and Practice, 2nd Edition, 1996.
R.M. Baecker; W.A.S. Buxton; J. Grudin and S. Greenberg, Readings in Human-Computer Interaction: Toward the Year 2000, 1995.
J.D. Foley et al., Introduction to Computer Graphics, 1994.
J. Zukowski, Java AWT Reference (Java 1.1), 1997.
B. Laurel, The Art of Human-Computer Interface Design, 1990.
D.A. Norman and S.W. Draper, User Centered System Design, 1986.
Analog Devices, ADXL05 Data Sheet, 1996.
Anthony Lawrence, "Modern Inertial Technology," Springer-Verlag, New York, 1993.
Teresa Anne Marin, Toward an Understanding of Musical Gesture: Mapping Expressive Intention with the Digital Baton, MIT Masters Thesis, Jun. 1996.
C.J. Verplaestse, Inertial-Optical Motion-Estimating Camera for Electric Cinematography, MIT Masters Thesis, Jun. 1997.
PenPoint API Reference, vols. 1 & 2, Addison-Wesley, 1992.
PenPoint Architectural Reference, vols. 1 & 2, Addison-Wesley, 1992.

(56) References Cited

OTHER PUBLICATIONS

Robert Carr and Dan Shafer, "The Power of PenPoint," Addison-Wesley , 1991.
Eric Azinger, "Radius Display Can Fit Different Orientations," InfoWorld, Jul. 22, 1991, p. 69, vol. 13, No. 29.
"IBM Technical Disclosure Bulletin, vol. 36 No. 1, Jan. 1, 1993, p. 414 "Reminder Pen"".
Office Action dated Feb. 4, 2011 in co-pending divisional Reissue U.S. Appl. No. 12/255,557, filed Oct. 21, 2008.
Hilary Lyndsay Williams, "Portable Computers", U.S. Appl. No. 12/255,557, filed Oct. 21, 2008.
Hilary Lyndsay Williams, "Portable Computers", U.S. Appl. No. 12/268,336, filed Nov. 10, 2008.
Hilary Lyndsay Williams, "Portable Computers", U.S. Appl. No. 12/268,254, filed Nov. 10, 2008.
IBM Technical Disclosure Bulletin, Title "Personal Computer Environmental Control Via a Proximity Sensor", Aug. 1993, US.
Ed Brown, William A.S. Buxton and Kevin Murtagh, "Windows on Tablets as a Means of Achieving Virtual Input Devices," Proc. of the IFIP TC 13, Cambridge, U.K., Aug. 27-31, 1990.
"Technology," Wacom Co., Ltd., Saitama, Japan, 2002.
Subutai Ahmad "A Usable Real-Time 3D Hand Tracker," In Proceedings 28th Asilomar Conference on Signals, Systems and Computers, pp. 1257-1261, 1995.
"Triax custom controllers due; video game controllers," HFD—The Weekly Home Furnishings Newspaper, vol. 67, No. 1, p. 122, Jan. 4, 1993.
Travis Butler, "Portable MP3: The Nomad Jukebox," TidBITS # 562, 2001.
Franklin Tessler, "Touchpads," Macworld, v. 13, No. 2, p. 68, Mac Publishing, Feb. 1996.
Richard Nass, "Touchpad input device goes digital to gie portable systems a desktop 'mouse-like' feel," Electronic Design, vol. 44, No. 18, p. 51, Sep. 3, 1996.
Easy Lai, "Touchpad," Notebook PC Manual, Beijing Acer Information Co., Ltd., Beijing, China, Feb. 16, 2005.
"Tips for Typing," FingerWorks, Newark, NJ, retreived from http://www.fingerworks.com/mini_typing.html on Jan. 10, 2008.
Kenneth B. Evans, Peter P. Tanner and Marceli Wein, "Tablet-Based Valuators That Provide One, Two, or Three Degrees of Freedom," Computer Graphics, v. 15, No. 3, Aug. 1981.
"Synaptics TouchPad Interfacing Guide," Synaptics, Inc., San Jose, CA, Jan. 22, 2001, second edition.
Michael Chen, S. Joy Mountford and Abigail Sellen, "A Study in Interactive 3-D Rotation Using 2-D Control Devices," Computer Graphics, v. 22, No. 4, Aug. 1988, pp. 121-129.
Jun Rekimoto, "SmartSkin: An Infrastructure for Freehand Manipulation on Interactive Surfaces," Proc. of the SIGCHI, pp. 113-120, Minneapolis, USA, 2002.
Franklin N. Tessler, "Smart input: how to choose from the new generation of innovative input devices," Macworld, v. 13, No. 5, p. 98, May 1996.
Lars G. Soderholm, "Sensing Systems for 'Touch and Feel'," Design News, Aug. 5, 1989.
"Design News: Product News," Design News, Cahners Publication, issue 11, Jun. 9, 1997.
"Design News: Product News," Design News, Cahners Publication, issue 9, May 5, 1997.
"Preview of Exhibitor Booths at the Philadelphia Show," The Air Conditioning, Heating and Refrigeration News, Business News Publishing Co., Jan. 13, 1997.
Franklin Tessler, "Point Pad," Macworld, Oct 1995, v. 12, No. 10, p. 87.
"Personal Jukebox (PJB): Systems Research Center and PAAD," Compaq Computer Corp., Oct. 13, 2000, http://research.compaq.com/SRC/pjb/.
"New & Improved: Touchpad Redux," PC Magazine, Sep. 10, 1996.
"National Design Engineering Show Conference," Design News, Cahners Publication, issue 5, Mar. 4, 1996.
"MultiTouch Overview," FingerWorks, Newark, NJ, retrieved from http://www.fingerworks.com/multoverview.html on Jan. 10, 2008.
"The Laser Focus World Buyers Guide," Laser Focus World, Nashua, NH, PennWell Publishing Company, Dec. 1995.
Marty Petersen, "Koalapad touch tablet & Micro Illustrator software," InfoWorld Media Group, Oct. 10, 1983.
William Buxton, Ralph Hill and Peter Rowley, "Issues and Techniques in Touch-Sensitive Tablet Input" Computer Graphics, 19(3), Proceedings of SIGGRAPH'85, pp. 215-223, 1985.
"Intellivision Intelligent Television Master Component Service Manual," Sylvania, Mattel, Inc., 1979.
T.L. Petruzzellis, "Force-sensing resistors," Electronics Now, vol. 64, issue 3, p. 65, Mar. 1993.
"Mouse Emulation," FingerWorks, Newark, NJ, retrieved from http://www.fingerworks.com/gesture_guide_mouse.html on Jan. 10, 2008.
"Gesture Recoginition," FingerWorks, Newark, NJ, retrieved from http://www.fingerworks.com/gesture_recognition.html on Jan. 10, 2008.
"LogiCad3D Product Overview—ErgoCommander?", LogiCad3D a Logitech company, Fremont, CA, retreived from www.logicad3d.com/products/ErgoCommander.htm on Apr. 8, 2002.
Minoru Kobayashi "Design of dynamic soundscape: mapping time to space for audio browsing with simultaneous listening," Thesis Massachusetts Institute of Technology, 1996.
Shinji Kobayashia and Katsumi Miyazawa, "Development of the touch switches with the click response," Koukuu Denshi Gihou No. 17: pp. 44-48, Mar. 1994.
Minoru Kobayashi and Chris Schmandt, "Dynamic Soundscape: mapping time to space for audio browsing," Proceedings of CHI '97, Mar. 22-27, 1997.
"Design News: Literature Plus," Design News, Cahners Publication, issue 24, Dec. 18, 1995.
David H. Ahl "Controller Update," Creative Computing, vol. 9, No. 12, Dec. 1983.
"Sony presents 'Choice Without Compromise' at IBC '97," M2 Presswire, M2 Communications Ltd., Jul. 24, 1997.
C. Cohen, "A Brief Overview of Gesture Recognition," 1999 retrieved from http://homepages.inf.ed.ac.uk/rbf/CVonline/LOCAL_COPIES/COHEN/gesture_overview.htm on Jan. 10, 2008.
"BeoCom 6000 User Guide," Bang & Olufsen, Struer, Denmark, 2000.
"Atari VCS/2600 Peripherals," retrieved from classicgaming.com on Feb. 28, 2007.
"Alps Electric introduces the GlidePoint Wave Keyboard; combines a gently curved design with Alps' advanced GlidePoint technology," Business Wire, Oct. 21, 1996.
"Alps Electric Ships GlidePoint Keyboard for the Macintosh; Includes a Glidepoint Touchpad, Erase-Eaze Backspace Key and Countoured Wrist Rest," Business Wire, Jul. 1, 1996.
Marc Spiwak, "A pair of unusual controllers," Popular Electronics, vol. 14, issue 4, Apr. 1997.
Marc Spiwak, "A great new wireless keyboard," Popular Electronics, vol. 14, issue 12, Dec. 1997.
Forrest Mims, "A few quick pointers; mouses, touch screens, touch pads, light pads, and the like can make your system easier to use," Computers&Electronics, v.22, p. 64,1984.
Brochure, "BeoCom 6000: Sales Training," Bang & Olufsen, Struer, Denmark, 2000.
"Der Klangmeister", Connect Magazine, Aug. 1998.
"Product Overview: iGesture Products for Everyone (learn in minutes)," FingerWorks, NewarK, NJ, retrieved from http://www.fingerworks.com/ on Aug. 30, 2005.
"Caz Pocket Computers Collection: BellSouth—IBM Simon—PDA cellphone," retreived from http://cdecas.free.fr/computers/pocket/simon.php on Nov. 21, 2008.
"IBM Simon," Wikipedia article, retrieved from from http://en.wikipedia.org/wiki/IBM_Simon last viewed on Nov. 21, 2008.
Chris O'Malley, "BellSouth's communicative Simon is a milestone in the evolution of the PDA", Byte.com, Dec. 1994, retrieved from http://www.byte.com/art/9412/sec11/art3.htm.

(56) References Cited

OTHER PUBLICATIONS

"IBM's plans to ship Simon put on hold for time being," Business Services Industry, Mobile Phone News, Apr. 4, 1994, retrieved from http://findarticles.com/p/articles/mi_m345.
Amon, C.H.; Nigen, J.S.; Siewiorek, D.P.; Smailagic, A.; and Stivoric, J., "Concurrent Design and Analysis of the Navigator Wearable Computer System: The Thermal Perspective," IEEE Transactions on Components, Packaging, and Manufacturing Technology, Part A, Sep. 1995, pp. 567-577, vol. 18, No. 3.
Order No. 58: Initial Determination Granting Motion to Terminate Investigation with Respect to Certain Claims; ITC Inv. No. 337-TA-797, Jun. 26, 2012.
G.L. Barret, "Filters and Other Touch Screen Enhancements," iTouch International, pp. 1-8, Archived by archive.org on Nov. 22, 2006, http://web.archive.org/web/20061122003733/http://www.touchinternational.com/literature/ whitepapers/ filtersandothertouchscreenenhancements.pdf (Available online at http://touchinternational.com/literature/whitepapers/ FiltersandOtherTouchScreenEnhancements.pdf, last visited Mar. 13, 2013).
"Noise Frequencies in Capacitive Touch Screens," IBM Retail Store Solutions, pp. 1-8, PDF document created Jul. 26, 2004. (Available online at https://www-304.ibm.com/support/docview.wss?uid=pos1R1003106&aid=1, last visited Mar. 13, 2014).
Krueger, Videoplace—an Artificial Reality, CHI'85 Proceedings of the SIGCHI conference on Human factors in computing systems, ACM, vol. 16, Issue 4, Apr. 1985, pp. 35-40.
Rubine, "Automatic Recognition of Gestures," Doctoral Dissertation, Carnegie Mellon University, Pittsburgh, PA, Dec. 1991, pp. 1-266.
Westerman, "Hand Tracking, Finger Identification, and Chordic Manipulation on a Multi-Touch Surface," PhD thesis, University of Delaware, Spring 1999, pp. 1-333.
Jenifer Tidwell, "Designing Interfaces: Patterns for Effective Interaction Design," O'Reilly Media, Inc., Sebastopol, CA, USA, First Edition, Nov. 2005.
R.M. Baecker and W.A.S. Buxton, Readings in Human-Computer Interaction: A Multidisciplinary Approach, Morgan Kaufmann Publishers Inc, Los Altos, CA, 1987.

* cited by examiner

MULTI-FUNCTIONAL CELLULAR TELEPHONE

Matter enclosed in heavy brackets [ ] appears in the original patent but forms no part of this reissue specification; matter printed in italics indicates the additions made by reissue.

*CROSS REFERENCE TO RELATED APPLICATIONS*

*More than one reissue application has been filed for the reissue of U.S. Pat. No. 6,956,564. The reissue applications are application Ser. Nos. 13/188,239 (the present application); 11/907,832 (parent reissue application), now U.S. Pat. No. Re. 42,738; and 12/255,557; 12/268,254; and 12/268,336, each of which are divisional reissues of U.S. Pat. No. 6,956,564.*

*This application is a division of broadened reissue application Ser. No. 11/907,832 filed Oct. 17, 2007, now U.S. Pat. No. Re. 42,738, of 09/171,921, filed Oct. 29, 1998, now U.S. Pat. No. 6,956,564, issued Oct. 18, 2005; and is related to co-pending divisional reissue application Ser. Nos. 12/255,557, filed Oct. 21, 2008; 12/268,254, filed Nov. 10, 2008; and 12/268,336, filed Nov. 10, 2008.*

BACKGROUND OF THE INVENTION

1. Field of the Invention

The present invention relates to portable computers and more particularly but not exclusively to hand-held computers of the kind sometimes referred to as personal digital assistants.

2. Related Art

A personal digital assistant includes data files defining such items as an electronic diary, address book and other applications such as word processing software, calculators and the like. As more powerful memories and processors have been developed in smaller packages it has become possible to provide quite powerful computers in relatively small portable cases. However, the limitation of miniaturisation occurs when a viewing screen and keyboard are needed for data input and read out. Thus, so called palm top personal computers (PPC) are usually of the order of 15 cm by 7 cm in order to provide a readable screen and a usable keyboard. Such palm top computers are known, for example Psion Corporation have produced a Psion Series 5 (trade mark) PPC having an 8 megabyte RAM and processor while Hewlett Packard similarly produce PPCs as e.g. the HP320LX (trade mark). The capabilities of such PPCs may be enhanced by incorporating so called flash cards enabling the expansion of the RAM by up to 10 megabytes or more while PCMCIA cards may be provided to enable connection of the PPC to telephone networks by way of cellular phones or telephony sockets for communication with other computers and the so called Internet and Intranets.

Most PPCs incorporate a docking arrangement to enable them to be connected with a desktop computer or other main frame for the purposes of synchronisation of data files and the like.

However, generally speaking PPCs are not robust and are prone to damage mainly because of the clam shell design requiring a hinge that opens to reveal the incorporated keyboard and screen. Thus PPCs are more usually used on a desk top or table or may be held in one hand while typing with the other.

SUMMARY OF THE INVENTION

According to the present invention there is provided a portable computer including movement detection means responsive to movement of the computer to produce an electrical output signal representative of such movement, processing means responsive to the output of said position detection means to determine detected movement data defining a user's intention, the processing means using said data to provide a mode response selected from a multiplicity of stored possible modes.

Preferably the movement detection means includes at least one acceleration or tilt detection means responsive to movement of the computer to produce the output electrical signal. There may be a plurality of acceleration detection means each producing a respective electrical output signal representative of movement components in respective directions, the detectors generally being mounted to detect X and Y movement components at a ninety degree angle.

The processing means may include a data input mode in which detected movement data is used to generate alphanumeric or graphical data. The alphanumeric or graphical data may be stored in data storage of the portable computer or may be output by transmitting means to receiving means connected to another processing device.

The processing means may include a screen output mode in which detected movement data is used to modify output to display means of the computer whereby scrolling of displayed information is effected. In the screen output mode the processing means may be responsive to relative lateral tilting movement to cause the display of information stored as to one or other side of currently displayed information. Relative rolling movement may cause the display of information stored as above or below the currently displayed information.

In the screen output mode the processing means may be responsive to detected movement data to determine a most likely orientation of the computer display means with respect to a user's eye line whereby the signals output to the display means may cause inversion of the displayed information such that the computer may be held and used in either hand.

The computer may include proximity detection means arranged to provide signals indicative of the proximity of the display screen to a user's view, the processing means being responsive to changes in the relative proximity to increase or decrease density of displayed information.

In a further development, security data derived from movement of the computer defining an authorised user's password is stored, the processing means being locked in a secure mode until detected movement data corresponding to the security data is received.

The computer may include a sound input device, the processing means having a second data input mode in which alphanumeric data is derived from input speech signals. A sound output device may also be included to permit the output of speech derived from stored data. Alternatively the sound input and output devices may be combined with a radio transceiver whereby cellular or other radio telephony networks may be used.

The computer may be housed in a casing shaped to facilitate a user holding the computer as if holding a writing stylus. The casing is preferably of substantially radiused triangular cross section along a substantial portion of its length and may include a flattened section incorporating a display screen. The casing may include angular shaping between a forward holding area and a rearward screen area the shaping being such as to provide a natural viewing angle of an incorporated display screen while the casing is held as a writing stylus. The shaping may also be such as to facilitate support of the rearward screen area by the dorsal aspect of a user's hand between the root of the thumb and index finger and the wrist.

BRIEF DESCRIPTION OF THE DRAWINGS

A portable computer in accordance with the invention will now be described by way of example only with reference to the accompanying drawings of which.

DETAILED DESCRIPTION OF THE EXEMPLARY EMBODIMENTS

Figure 1:
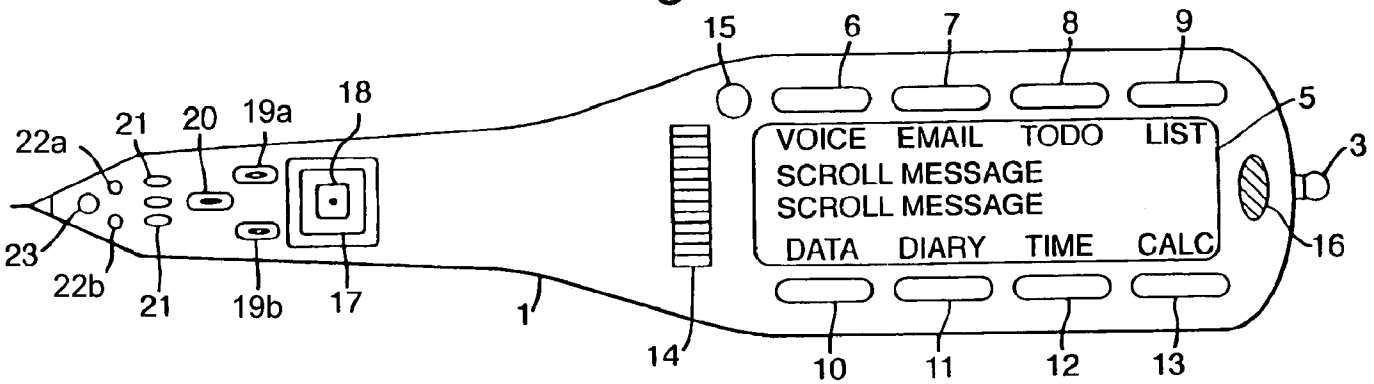
FIG. 1 shows a plan view of the computer.
Figure 2:
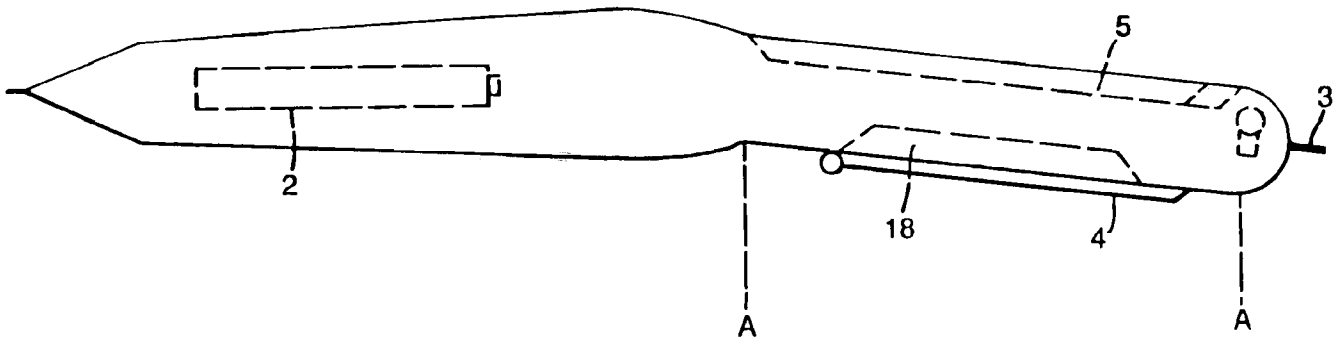
FIG. 2 shows a side view-of the computer of FIG. 1.

Referring to FIGS. 1 and 2, the hand-held computer of the present invention has a case 1 of a moulded plastics material having a triangular barrel cross section towards the forward end, that is towards the point, with radiused sides providing a diameter of approximately 15 mm. The case is shaped to have a curve so that when the forward part of the barrel of the casing is held as a writing stylus using the thumb, index finger and second finger of the user, the screen area A-A rests comfortably on the dorsal area at the back of the hand between the root of the thumb and index finger of the hand and the user's wrist. This provides some additional support to allow the entire computer to be operated using one hand only. After assembly the case is sealed using an O-ring seal much in the manner of sealing watch parts. Coating the casing with wax polythene completes the sealing of the unit so that to all intents and purposes the case is waterproofed.

The casing is weighted at one end (for example by including a rechargeable battery 2) at the forward end so that if the item is dropped on to a surface it tends to fall in a specified manner such that the tip which may include some impact protection, for example by being rubber cased, prevents any significant damage to internal components. The weighting also assists balancing of the unit in a user's hand.

The case may incorporate a hook 3 for attachment of a strap or key ring (not shown) and may have a pocket clip 4. The hook is preferably recessed within the casing.

Externally mounted a small liquid crystal diode screen which may be of the kind manufactured by Batron and supplied under type number BT42003STYC is included. To either side of the LCD 5 touch or pressure sensitive switches 6 to 13 are provided. These switches may be soft programmed to provide functions as hereinafter described. A touch scroll strip 14 (hereinafter described) is provided in front of the screen 5 and the system includes a pyroelectric detector 15 used in determining the proximity of the computer to a user's eye.

Audio input and output devices are also provided together with an alerting device. For example, a microphone 16, annunciator 17 and speaker 18 may be included. Finger switches 19a, 19b, 20 are provided forward of the annunciator 17 and again may be soft programmed for functionality. Also visible are gold docking pins 21 used for connecting the hand-held computer for recharging of the battery 2 and transfer of data by way of a docking device to other computers, for example desk mounted personal computers.

As an alternative means of transferring data from the computer of the invention to another processing device or to enable the computer of the invention to be used as an input device for a PC, an infrared transceiver 22a, 22b is mounted towards the front of the casing 1.

Also included is a light emitting diode 23 which may be of the kind having three or more colours. Individual colours allow for a small amount of illumination or may be used to provide indication or alarm functions. Alternatively, a single coloured red light emitting diode part TLSH180P from Toshiba may be used. This ultrabright LED aids human night sight viewing and whilst only being of low power may in a dark environment assist the user.

Figure 3:
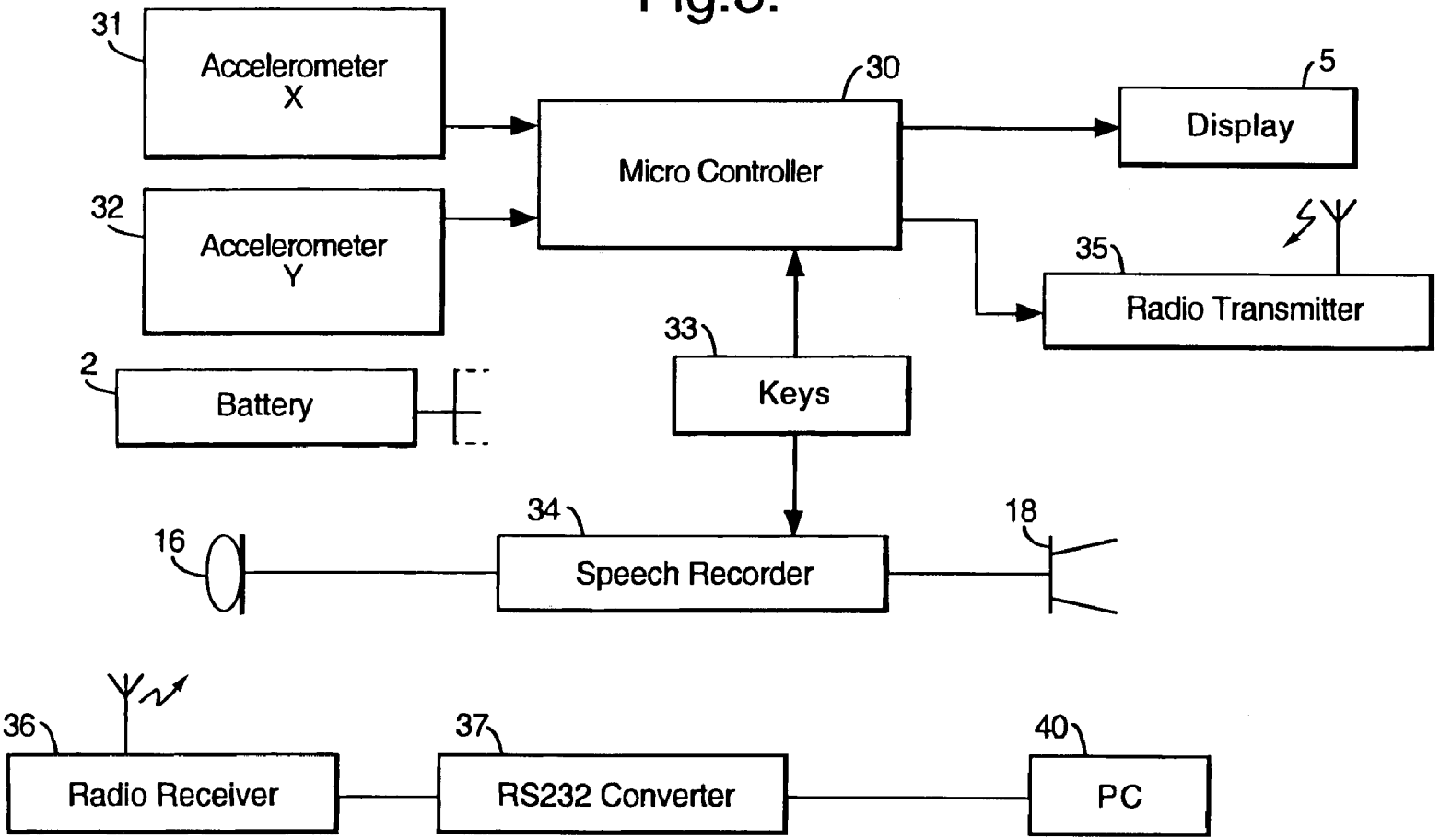
FIG. 3 is a block schematic diagram of the circuits of the computer of FIG. 1.

Turning now to FIG. 3, a block schematic diagram of the component parts of the computer is shown. It will be noted that the display 5 receives inputs from a microcontroller 30 which may be of the type supplied by Microchip under the reference PIC16C74. The PIC16C74 includes on board read only memory (ROM) but in a preferred embodiment an ARM processor with a larger memory is used. Also mounted within the casing 1 are two accelerometers 31, 32 which may be of the kind known as ADXL05 from Analog Devices Limited and which are buffered by operational amplifiers, for example National Semiconductor type LPC662. The keys 6 to 13 and 18 to 20 are here represented as a keypad 33. Some of the keys may be used to control a speech recorder 34 which is also used as an interface between the microcontroller 30, and microphone 16 and the speaker 18. A radio transmitter 35, which may be a radio transceiver, is also incorporated.

One function of the radio transmitter may be to allow use of the hand-held computer of the invention as an input device for a desk mounted or other PC 40 having corresponding receiver 36 and an appropriate converter without physical interconnection. Other functions of the transceivers 35, 36 may be apparent from the description hereinafter.

Figures 4A, 4B:
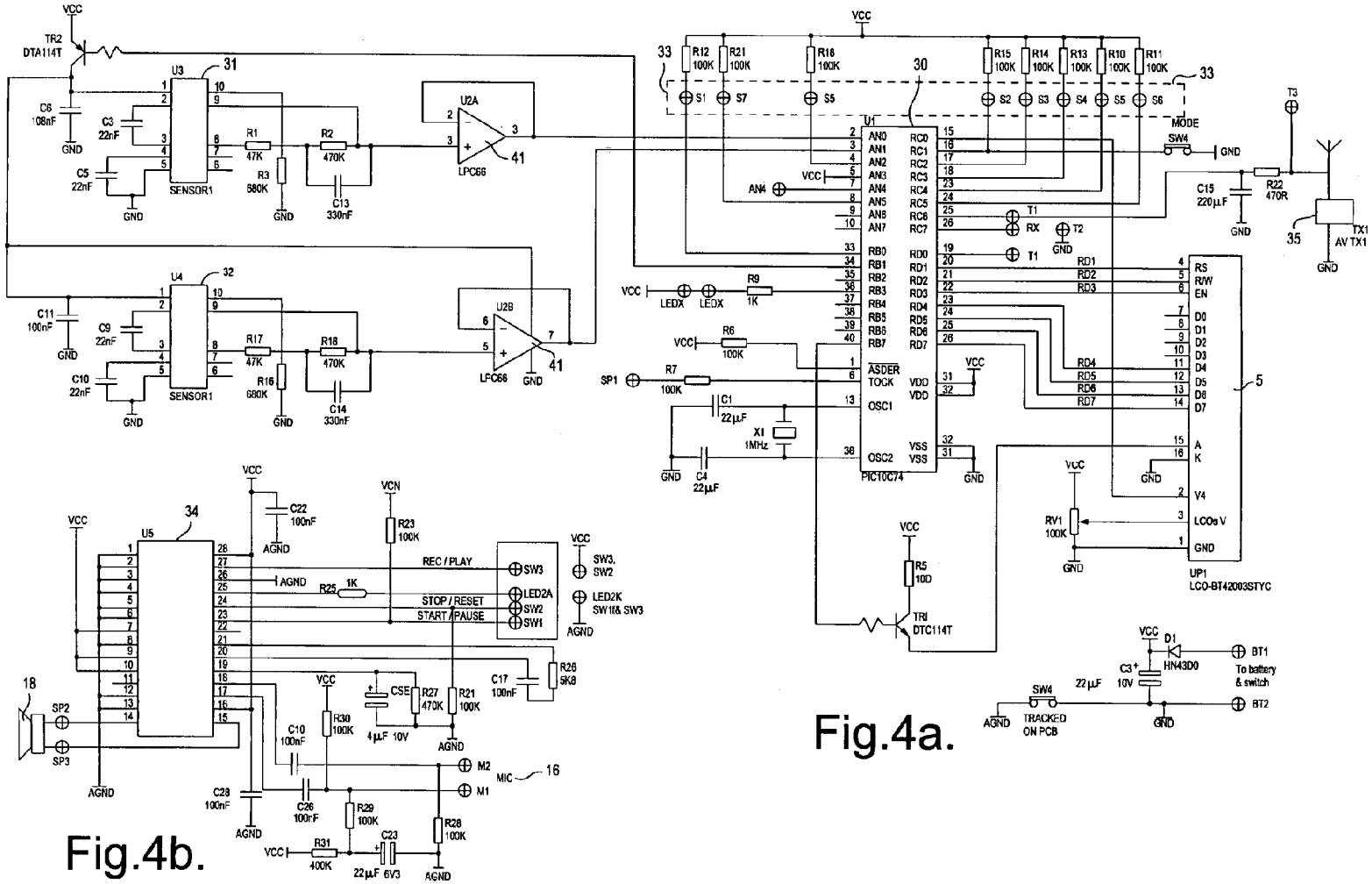
FIGS. 4a and 4b provide a circuit diagram showing details of the circuitry described with respect to FIG. 3.

Referring now to FIGS. 4a, 4b the microcontroller 30 is connected to the display 5 using standard control inputs of the display to provide a visual output of the result of program activities requested by the user. It will be noted that the accelerometers 31 and 32 have associated buffer circuits which each include an operational amplifier to buffer the input to the microcontroller. The operational amplifiers 41 may be type LPC662 from National semiconductor.

Power to the accelerometers 31 is by way of a transistor TR2 so that if the microcontroller 30 determines that no movement of the computer is occurring or that the present program does not require use of the accelerometers 31 and 32, output RB1 may be set to stop current being drawn to minimise battery usage. The microcontroller may allow periodic sampling during dormant periods so that if the computer is picked up the sensors may again be activated.

An EEPROM integrated circuit chip type X24F064 8 Kbyte from Xicor providing 8 Kbytes of memory is also provided accessible from the microcontroller 30 in known manner. Switches S1 to S8 (keys 33 in FIG. 3) are wired to respective inputs of the microcontroller 30.

Note that TR1 controls power input to the back lighting circuitry of the LCD display 5. Again, the microcontroller 30 will normally bias TR1 off when the computer is dormant and will maintain TR1 biased off unless back lighting is requested by operation of one of the keys of the keyboard 33.

For the avoidance of doubt it is here noted that the microcontroller 30 includes a program which uses position outputs from the accelerometers 31, 32 to determine from the orientation of the computer whether the hand-held computer is in the left hand or right hand of the user. It is here noted that accelerometer output may depend upon the tilt angle of the included accelerometers to the earth's gravitational field. The keys S1 to S8 are then swapped over in soft programming mode such that functionality is determined by the apparent top of the display 5 to the user in its current position. Similarly, determination of orientation of alphanumeric or other display information on the screen 5 will be determined from the orientation of the computer itself. Thus, data output to the screen from the controller 30 arranged to provide an appropriately oriented display.

The speech recorder 34 is implemented using Sequoia technology sound recording integrated circuit type ISD2560. The Sequoia technology chip is capable of recording 60 seconds of speech message in digital form and is connected so that the microphone 16 can be used to provide an input. The three switches SW1, SW2 and SW3 may correspond to the fingertip switches 18 to 20 of FIG. 1 or may be selected in software from keys 6 to 13.

In speech recording mode SW1 provides a start and pause control function for the user, SW2 is a stop or reset function while SW3 switches between the record and play modes.

Short messages are played back by way of the loud speaker 18. As currently implemented the microphone 16 is a Maplin type QY62S, the speaker is from Hosiden type HDR9941. "Speech notes" recorded by this method may be down loaded to a PC for sorting and categorising.

Figure 5:
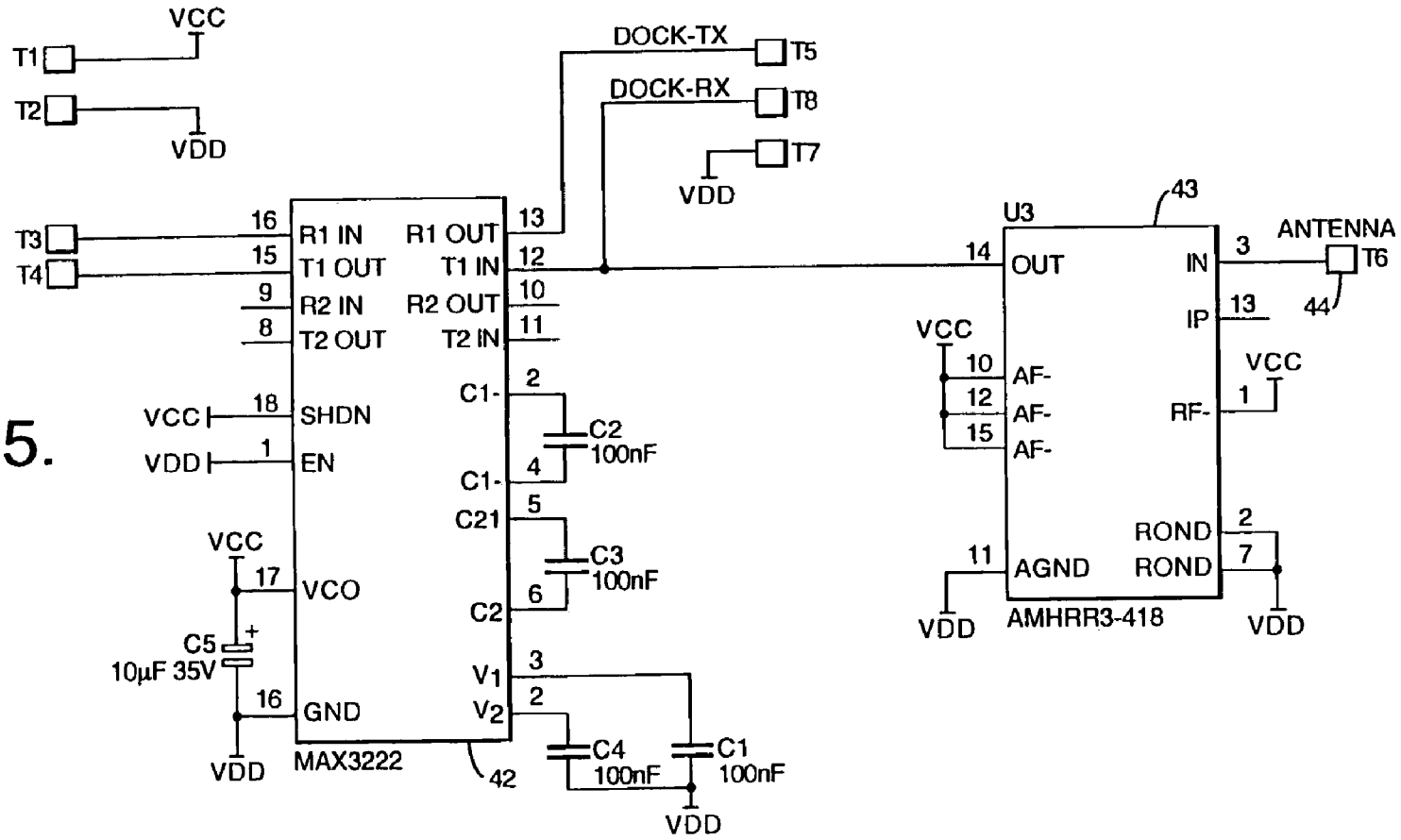
FIG. 5 is a circuit diagram of a docking station to enable the computer of FIG. 1 to be connected to a desktop or other device.

Turning briefly to FIG. 5, the hand-held computer of FIG. 1 can be inserted in a corresponding docking port shaped to align the contact 21 with T5 to T7 of FIG. 5. The contact T5 and T8 provide serial receive and transmit paths for synchronising databases between a PC and the portable computer and also provide battery charging. Contact T7 provides an earth contact. Speech samples and other data may be up loaded from a PC to the portable computer.

A Maxim integrated circuit 42, which may be type MAX232IC, converts RS232 level serial output and input required by current PCs to the voltage level required by the microcontroller 30 of FIG. 4. Note also the ability to receive radio input by way of an antenna connected to the radio receiver chip type AMHRR3-418.

Having discussed the hardware of the portable computer of the invention we shall now consider various uses to which the writing stylus input, voice input and screen may be used. Exemplary flow charts for some aspects of the use of the portable computer are attached. While functions are individually discussed in respect of the flow charts of FIGS. 6 to 9, it will be appreciated that combinations of programs may be used in the implementation of features described hereinafter.

Figure 6:
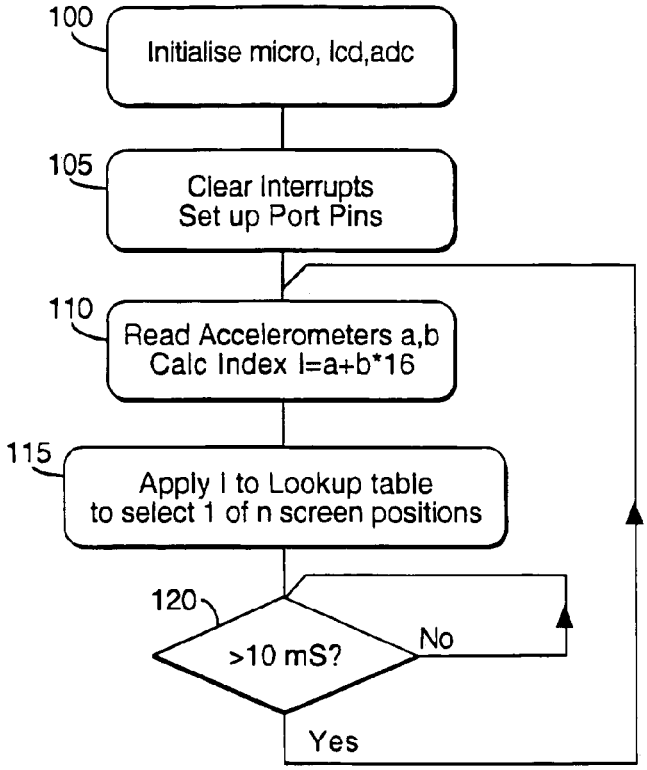
FIGS. 6 to 9 are flow charts showing some of the programs incorporated in the microprocessor of FIG. 4.
Figure 17:
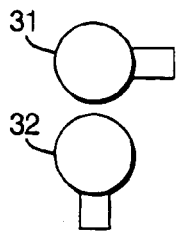
FIG. 17 shows mounting positions of the accelerometers of FIG. 4 with respect to each other.

Turning now to FIG. 6, the tilt sensor software uses inputs from the accelerometers 31, 32 which, as shown in FIG. 17 to which reference is additionally made, are mounted with their respective sensitive axes at right angles to each other. As will have been seen from FIG. 4, the output from each accelerometer is filtered by a resistor capacitance network to remote high frequency noise for example, and the outputs are then read by an analogue to digital converter included within the microcontroller 30. Thus, referring to FIG. 6, for special sensing the microcontroller 30, display 5 and analogue to digital conversion circuits are initialised at 100 and the interrupts and port pins of the microcontroller 30 are reset or cleared at 105. The output of the accelerometers 31, 32 is read from respective analogue input pins AN0 and AN1 of the microcontroller 30 and an index to a look up table is calculated at step 110 using the formula $I=a+(b1\times16)$. In this case a is calibration constant and b1 is the digitised output of the accelerometer 31. This allows for a look up table allowing a16 by 16 matrix of left to right position to be determined. For vertical tilt position the formula $I=a+(b2\times16)$ where b2 is the output of the accelerometer 32 may be used to address a further matrix to determine the relative up/down position. By applying one or more of the indices to the look up table, it is possible to select one of n screen positions or to determine the amount of movement since the last reading at step 115. The system then waits for 10 ms as indicated at step 120 before repeating the reading of the accelerometer output.

The program allows for the screen 5 to be scrolled in accordance with the user's requirements. The mounting of these sensors, as shown in FIG. 17, allows posiitonal movement such as up, down, left and right to resolved to fractions of a degree.

Figure 18:
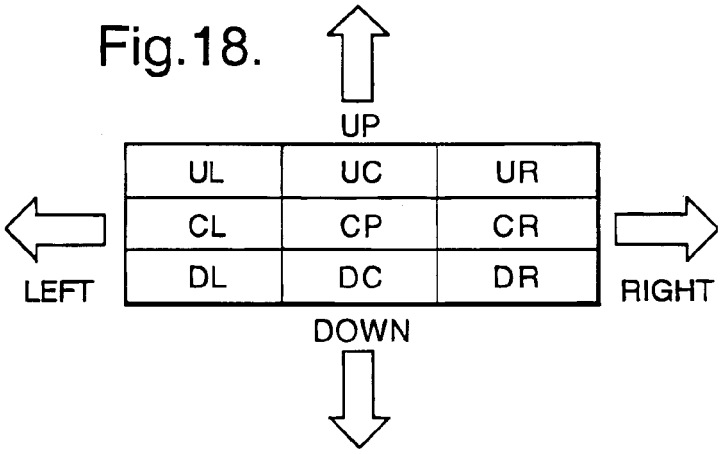
FIG. 18 is a table showing a program response to movement of the accelerometers of FIG. 16 in a particular mode of operation.

Using software the microcontroller 30 may use the output from the accelerometers 31, 32 to determine a user's requirement for a different view to be displayed on the screen 5. Thus a virtual hinge is created such that if the user moves the stylus whilst it is in viewing position the screen information may be changed to respond to a natural reaction for looking up or down or to the left or right. Thus, as shown in FIG. 18 in a simplified arrangement, if the display on the screen at any time is designated as current page (CP) then tilting the stylus towards the left will cause the display of a page stored as to the right of CP (CR). The page which was formerly CR (as represented by data held within the storage of the microcontroller 30 or an associated data store) is now CP. Tilting the stylus to the right will cause a page of information (CL) to the left of CP to be displayed. For the avoidance of doubt the term page is used here as for a screen for information. Thus the action of tilting the stylus to the left or right is analogous to the natural inclination to look through a window towards the right or left to obtain additional information from a scene.

Similarly, if the stylus is turned towards the user information stored at UC will be displayed and tilting the stylus away results in the information DC being displayed. It will be appreciated that combining tilt angles may result in the display of information up and to the left (UL), up and to the right (UR), down and to the left (DL) and down and to the right (DR). This simplified description of a multiple line screen moving as if a jump is occurring should be considered as allowing single line scrolling in which CP defines the top line of the screen, DC the line below and further lines to the limit of screen viewability also being displayed with CP such that single line scroll movement or smooth scrolling appears to occur. Finer scrolling modes such as single pixel movements are also possible. The user may select the rate of response using keys 6 to 13 or fingertip switches 18 to 20. It should also be noted that the tilt sensor arrangement 31, 32 allows the microcontroller 30 to determine the most likely viewing angle and to adjust pixel mapping to the screen accordingly so that if a user holds the stylus in the left hand the display is inverted to that shown in FIG. 1 so that the bottom right corner, as viewed by a right handed user, becomes the top left corner as viewed by a left handed user. It should be noted that the microcontroller does not require an input from the user to determine whether the stylus is being held in the left or right hand and, if a user changes hands during the course of viewing the screen output will be inverted accordingly.

It is also possible, particularly if pictorial rather than alphanumeric display is required, for the screen to enter a "portrait" mode if the stylus is held vertically. In this case the orientation will be appropriate to the stylus being held with its tip above or below the waist of the stylus.

To prevent scrolling or orientation change the user may use a soft key 6 to 13 or fingertip switch 18 to 20 to lock and unlock display movement.

Further, while as described with reference to FIG. 3, the display screen is a Batron, in a preferred embodiment a Kopin Cyberdisplay 320 having ¼ VGA colour resolution may be used. Using the Kopin display and the associated monocular viewing lens mounted end on to the body allows clear viewing of some 15 lines of normal text. The Kopin Monocular lens is approximately 20 mm by 18 mm which gives an acceptable size to a pen body incorporating movement sensing means as herein described.

In a still further development the pyroelectric detector (Murata type IRA- E700STO) 15 may be used to detect the presence of the user and the proximity of the user to the viewing screen 5. Using the Kopin ¼ VGA display it is possible to decrease the size of character displayed. Thus the microcontroller 30 uses the output of the pyroelectric detector 15 to determine how close to a user's eye the stylus is held and may adjust the size of print so that more characters are fitted on the screen 5. In this way large areas of text may be read by holding the screen close to the user's eye. A further use of the pyroelectric detector for power saving purposes it discussed hereinafter. As has been mentioned detection of the position of the screen with respect to the user's left or right side is possible.

Figure 8:
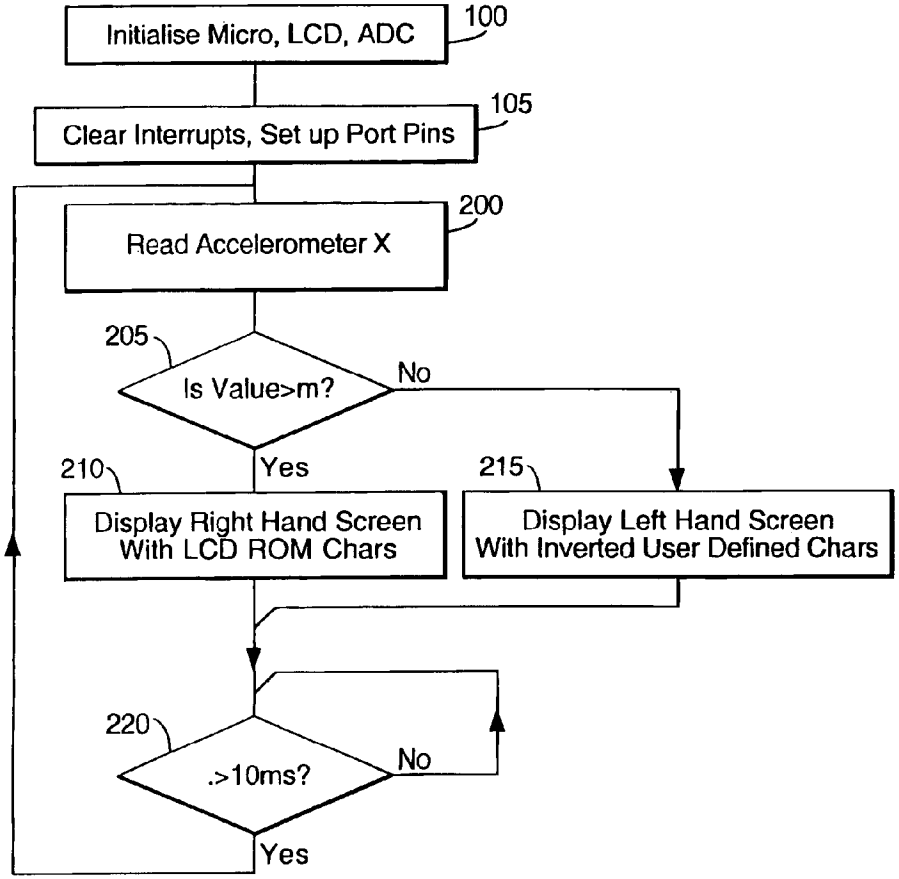

Referring to FIG. 8, clearing of interrupt and set port pins and initialisation as previously mentioned with regard to FIG. 6 is carried out. One of the accelerometers, for example the accelerometer 31, is read at step 200 and its value compared with a predetermined value m. Values greater than m indicate that the display is most likely in the user's left hand so that as indicated at 215 inverted characters are displayed on the screen 5. If the value read from accelerometer 31 is less than m then it may be assumed that the stylus is in the user's right hand and normal ROM LCD characters are displayed. As indicated at 220, a check may be carried every 10 ms to determine the whereabouts for the screen.

It is envisaged that input to the computer system either for use as a PDA or for word processing purposes, will be carried out either by hand writing recognition (HR) or by voice input using the microphone 16. Handwriting recognition does not require the user to write on a surface, although some users may find this a preferable method of operation, but requires the user merely to move the stylus (that is the whole computer) as if writing letters and numbers. Katakana or Cyrillic texts may also be entered as may symbols.

Figure 11:
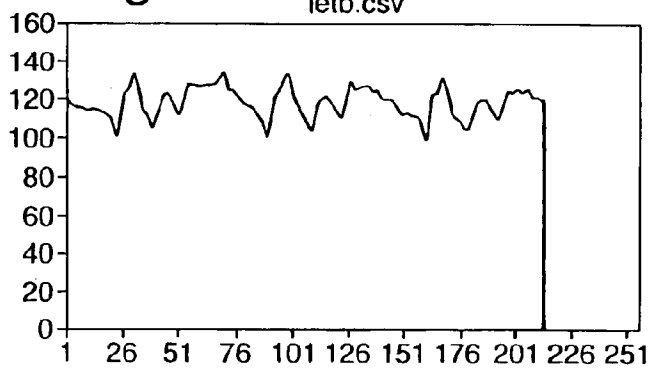
FIGS. 10 to 13 are graphical representations of the outputs of the accelerometers of FIG. 4 as analysed by the microprocessor.
Figure 10:
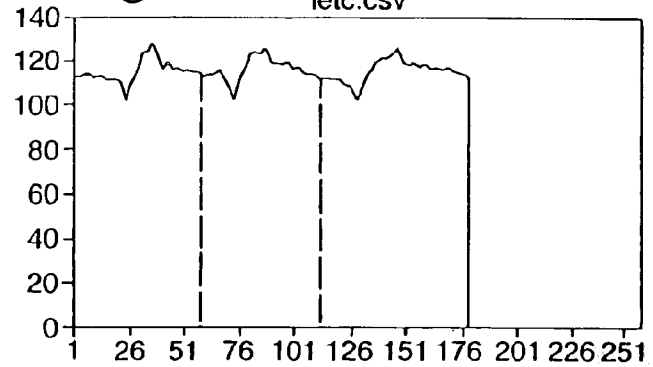
Figure 13:
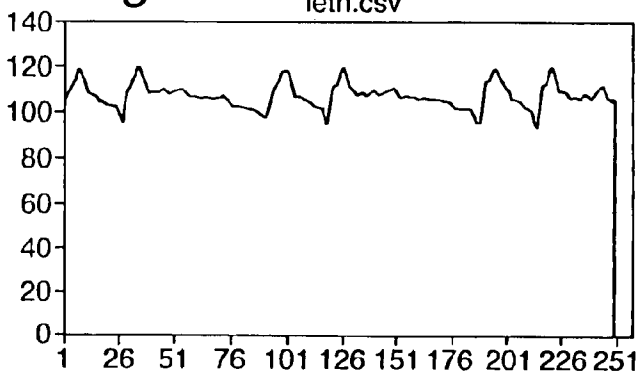
Figure 12:
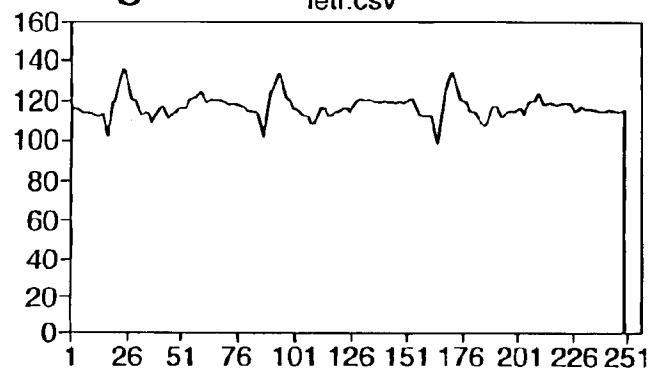

Thus using one of the two accelerometers 31, 32 and referring to FIGS. 10 to 14, the output of one of the accelerometers 31, 32 is read at a simple rate of 100 times per second. The received data is stored in a random access memory (RAM) buffer as a set of acceleration values against unit time. Using a software process of autocorrelation the microcontroller 30 may determine the character entered. Thus, referring to the Figures, FIG. 10 shows three entries of the letter C, FIGS. 11 shows three entries of letter B, FIG. 123 entries of letter F and FIG. 13 three entries of letter H for exemplary purposes only. Feedback to the user either on the display or by character speech output or simply by an acoustic beep indication may be used to note acceptance of a character. The validity indication may be user selectable.

Figure 14:
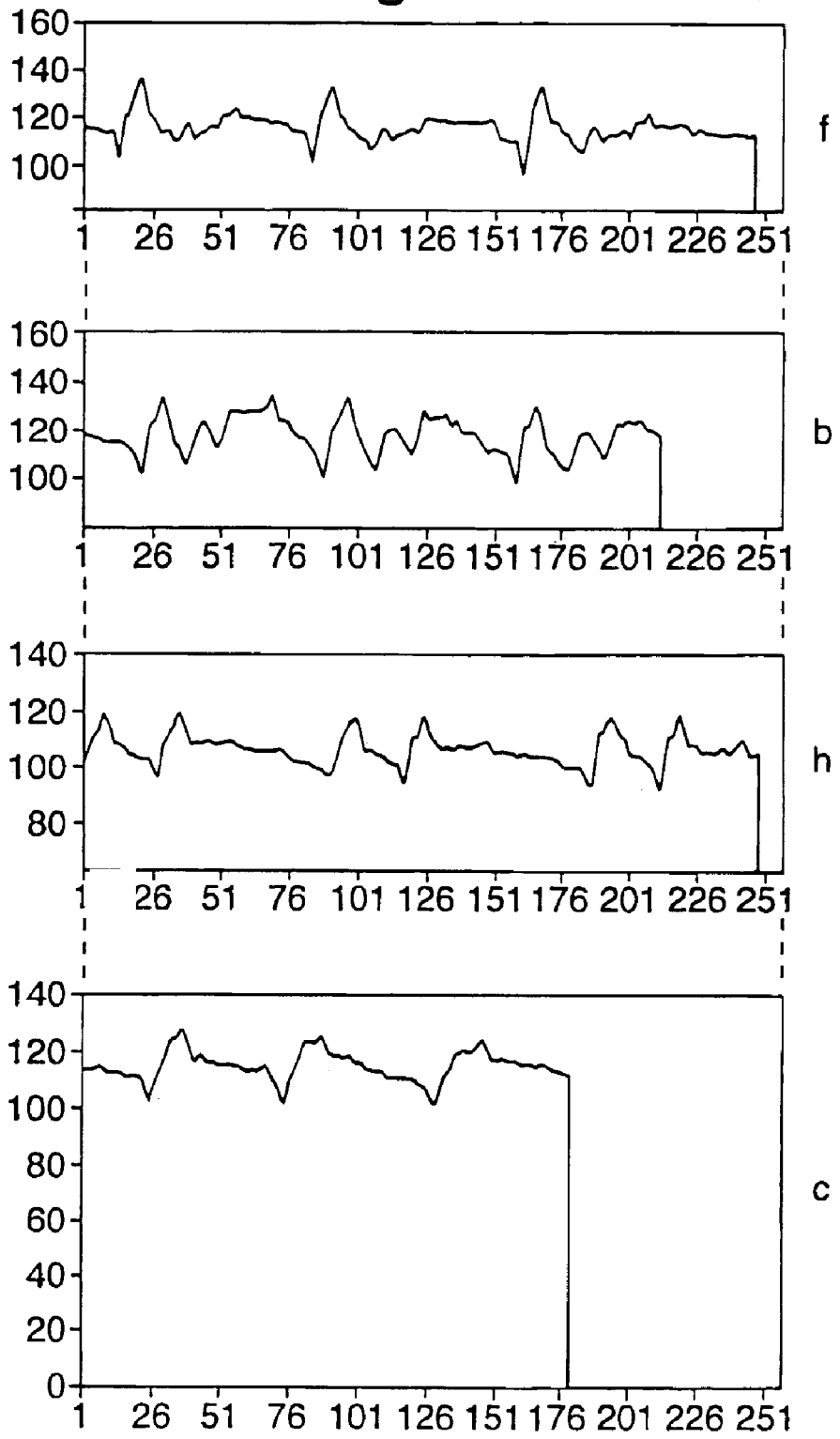
FIGS. 14a and 14b provide a graphical comparison of the representations of the outputs of the accelerometers as shown in FIGS. 10 to 13.

It will be noted from FIG. 14 that a single accelerometer output is distinct for each of the input characters and therefore the microcontroller can determine the entry made. The entry may be of text which can be reflected to the viewing screen 5 or maybe instructions couched in appropriate terms such as "get Monday diary". Once the diary has been recovered from the store the appropriate entries may be displayed on the screen 5 with appropriate soft key indications for the keys 6 to 13.

Note that predefined user gestures such as drawing an "envelope" to request e-mail mode or a table for diary mode, for example, may be used. The instructions may be user selectable or teachable so that on initialisation the user draws and selects the mode. Subsequently drawing the same symbol will cause the microcontroller 30 to enter the appropriate selected mode.

Again sensing may be used to move around the displayed area (as discussed with reference to FIG. 6 and FIG. 18) or the touch strip controller 14 may be used in combination with the keys 6 to 13 to select appropriate areas.

Figure 19:
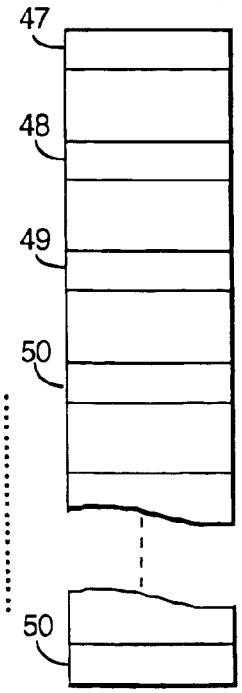
FIG. 19 is a schematic diagram of a part of a scroll detector of the portable computer of FIG. 1

Entry of information to the diary may also be by handwriting input. It is convenient here to consider the construction of the touch strip 14 which as shown in FIG. 19 comprises a 0.4 mm printed board having a surface area of approximately 20 mm by 5 m with horizontal strips in the 5 mm dimension as indicated as 47 to 50 for FIG. 19 which shown a part of the strip 14. The strip 14 thus replaces the rotational elements of potentiometer so that hermetic sealing of the casing may be complete and a control which is resistant to wear as provided. The strips 47 to 50 etc, are interfaced to the microcontroller 30 so that as a finger is moved across the strip direction of movement and speed of movement may be determined. The information may be used in the same way as a rotary potentiometer.

It will be appreciated that incorporating a second strip at right angles to the strip 14 would allow full functionality of (eg) a computer mouse to be simulated.

Thus as shown in FIG. 19, if a user moves a finger such that, for example, the presence of the finger bridging 48, 49 and 50 subsequent to the presence of a finger bridging 47 to 50 indicates that the user would wish to rotate a potentiometer in a counter-clockwise direction. Similarly, detection of a finger bridging 47 and 48 subsequent to there having been no previous bridge indicates rotation in a clockwise direction.

It will be appreciated, however, that if the tilt detection mechanism hereinbefore described indicates that the device is in the left hand rather than the right hand the functionality of bridging and unbridging is reversed accordingly.

Entry of data files, for example the composition of letters or reports can be carried out using either the write sensing arrangement, hereinbefore described, to determine input alphanumeric which may be stored for subsequent transmission to a printer or for transfer as data files to a PC for example. Data entered and converted into appropriate stored information may be displayed on the display screen if required.

Cursor movement around the display screen to select a position to which information is to be placed may be by use of either the potentiometer arrangement described with reference to FIG. 19 or by use of the tilt sensing mechanism hereinbefore described in combination with one of the soft keys to indicate that an insert or delete position is being selected.

Figure 7A:
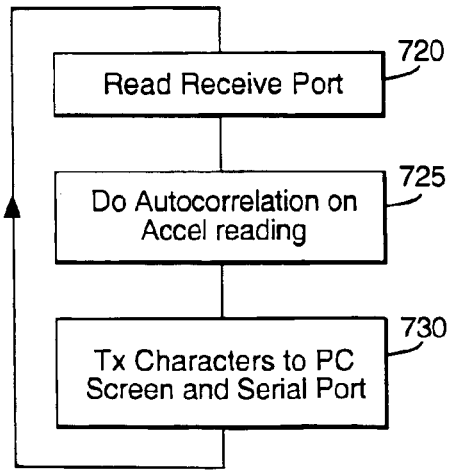
Figure 7B:
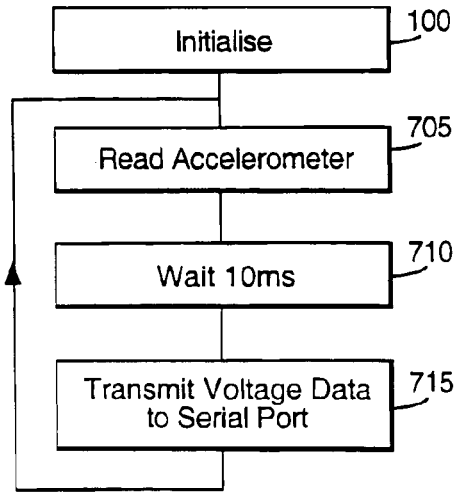

In an alternative method of operation and referring to FIG. 7a and initially to FIG. 7b, use of the stylus of FIG. 1 as a non-connected input device for a PC allows all of the functions of the hand held computer to be duplicated. For example, where alphanumeric data is input in the manner previously described with reference to FIGS. 10 to 14 a more powerful PC may be able to effect autocorrelation much more rapidly than the microcontroller 30 of the device itself. In this case, referring specifically to FIG. 7b, once the initialisation process has been completed at 100, one or both of the accelerometers may be read at 705 at 10 ms intervals as indicated at step 710 and the voltage data is transferred to the serial port for transmission by the wireless link or by use of infrared transmission.

A corresponding program in the PC itself will read from radio receiver 36 and the receive port the data defining the voltage from one or both the accelerometers. Autocorrelation will be carried out on the reading to generate appropriate characters at step 725, the characters being displayed on the PC screen at step 730 and possibly being transmitted back to the hand-held PC.

In an alternative implementation autocorrelation may be carried out within the microcontroller 30 and data defining input characters themselves be transmitted to the PC.

Note that the transmission of comma separated variables (CSV) format ASCII is transmitted at 418 MHz using an amplitude modulated radio transmitter from RF Solutions of Lewes East Sussex UK. In the PC CMOS voltage levels converted by the RS232 conversion unit can be used to provide raw data to the PC. Windows 3.1 terminal software is capable of reading CSV data and spreadsheet can read and plot data graphically.

In a still further use of the accelerometer 31, 32 arrangement password protection of the hand-held computer may be provided. Thus, once trained to a user's signature, for example, a stored waveform corresponding to accelerometer voltage outputs read at 10 ms intervals can be used. Thus the user does not require to remember any special passwords and cracking of the signature code is extremely difficult since, for example forging a signature will result in a different acceleration pattern to that of the natural signature writer.

Thus it may be possible to use a hand-held computer of this nature to provide transmission of security information for, for example, electronic point of sale authorisations, access restriction and the like.

A still further use of the transmission and reception capability allows a local area paging system to be developed. Thus if several users work in reasonable proximity to each other it is possible to transmit a message directly from one hand-held computer to another such that, for example, telephone messages taken by one person in an office and files created may be transmitted using a digital serial identity to another specified hand-held computer unit.

Figure 16:
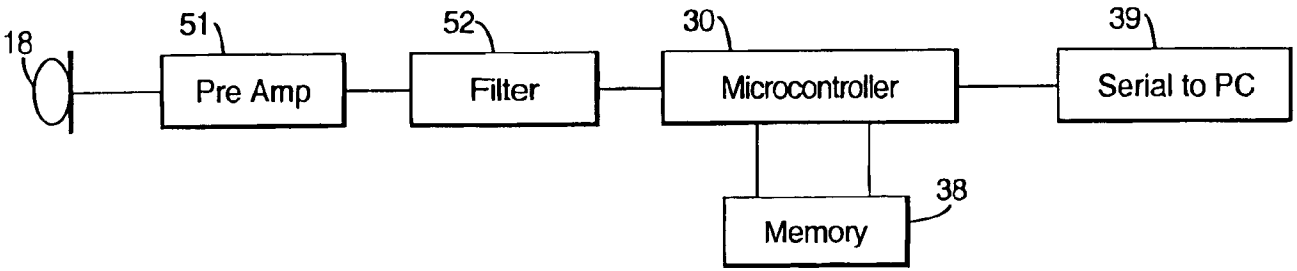
FIG. 16 is a schematic diagram of a voice input arrangement of the portable computer of FIG. 1.

Turning to FIG. 16, in addition to the simple 60 second voice note storage chip 34, the microphone 18 may also be connected by the amplifier and filter arrangements to provide voice input to the microcontroller 30. Voice recognition software can thus be used to convert the voice input to data, the keys or fingertip switches 18 to 20 having appropriate use for pause, record, etc as hereinbefore described with reference to the spoken memorandum chip. Converted data can thus be transferred to the memory or displayed on screen or as hereinbefore described with reference to using pen input for handwriting correlation by a PC serial data to the PC representing the voice input can be provided. This is indicated at 39.

In an alternative method of working, the microcontroller causes storage of the speech input in the memory 38 without effecting conversion, the information being transmitted via the serial output port either in the docking station or by the radio link to a PC which may use voice recognition software to carry out the conversions. It may be preferable to use a PC to carry out the conversion rather than a microcontroller incorporated in the pen since significant processing power may be required. However, the inclusion of voice recognition software in the microcontroller 30 is possible.

It will also be realised that a data store may be used to store received speech signals. Thus several speech notes each time/date stamped may be held for subsequent use. If a suitable store is included then the speech storage chip, hereinbefore described, may be omitted from the stylus to allow additional memory chip space.

It will be noted that since the hand-held computer of the invention includes microphone, loudspeaker and function keys use of the device as a cellular telephone is also envisaged.

Where cellular phone functionality is included within the stylus or where the stylus is in contact with a PC for example by IRDA or radio transmission, the use of the microphone input for substantial dictation purposes is possible and also the use of substantially larger data files than could otherwise be stored locally.

Thus the input speech will be stored in a buffer by the microcontroller 30 and periodically, when the buffer contains a substantial amount of data, a network connection to either network data storage means or to a predetermined PC is effected. Stored buffered data is then transferred to the remote location. Since the network connection is not permanently required the cost of transferring the data by this means is less significant and periods of network signal weakness can be overcome.

Data buffered in this manner may be date and time stamped or, if the stylus incorporates GPS (global positioning systems) may be location stamped also.

Data may similarly be recovered such that large text documents required by a user may have portions stored in the buffer for display and sequential recovery of other parts of the document from the remote location using telephony as required. Photographic data, for example from a digital camera, may similarly be saved to the network by way of the buffered store.

The various functions above described enable the provision of a full PDA function including diary alarm and scheduling functions as well as data input, file creation and storage. The user may select the mode of operation using either soft buttons or movement input and the use of the accelerometers 31, 32 is determined from the mode selected by the user. Electronic mail and fax facilities may be incorporated in the PDA functions allowing reception or transmission of data via the unit. The transmission capability of the unit may be associated with a receiver in a printer for example or a printer incorporating a docking station may be used to allow the printing of data from the PDA. Note that infrared transmission may be used.

As will be appreciated one of the major problems with any hand-held portable device is the use of rechargeable batteries which have a limited power life between charges. The hand-held computer of the present invention therefore incorporates a number of power saving facilities arranged particularly to close down back lighting of the small LCD screen 5 if it is not appropriate. Thus if the accelerometers indicate that there is no current usage of the system then powering down of the detection circuitry and back lighting of the screen may occur. However, in a further use of the proximity detector 15, it is possible to turn back lighting on and off in dependence upon whether the user is looking at information on the screen or not. Thus, referring to FIG. 15, the pyroelectric detector conversion detects presence of movement to maintain back lighting. Pyroelectric detectors tend to detect presence of a person by movement through a parallel beam of infrared such that when movement is detected across a Fresnel lens an AC signal is generated.

Thus the pyroelectric system can be used to detect the presence of a user and in the absence of use power down of the back lighting at least may occur. Infrared sensors may similarly be used to detect the presence or absence of body heat. Note the pyroelectric detector, as previously described, can be used to control the character zoom feature hereinbefore described. A suitable detector is a Murata type IRAE700STO.

Figure 15:
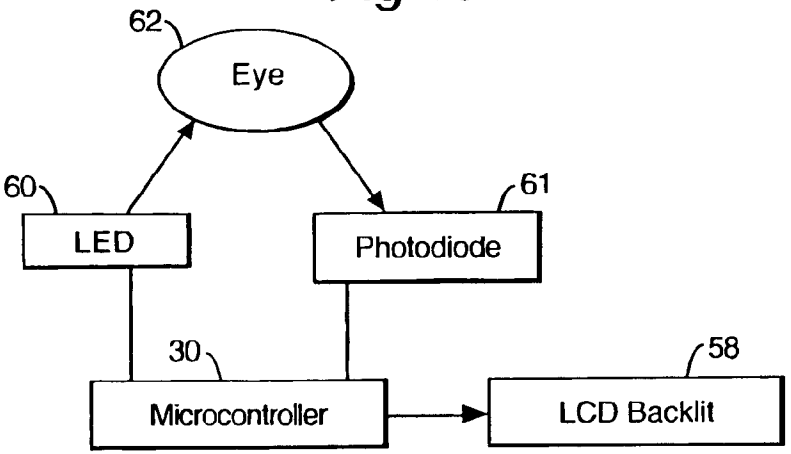
FIG. 15 is a schematic diagram of a power saving arrangement of the portable computer of FIG. 1.

In a further implementation of back lighting power down which is responsive to the viewer's vision in addition to the viewer's presence. It is known that when a subject looks directly at a lens and a flash occurs blood vessels at the rear of the eyes reflect back to the camera. It is thus possible to periodically flash a low level light and to sense red reflection using a photodiode sensor. Thus as shown at FIG. 15, the microcontroller 30 periodically causes an LED 60 to pulse. At the same time a photodiode 61 is monitored and, assuming presence of a user's eye 62 reflecting light from the pulse, the LCD will remain back lit as indicated at 58. It is further noted that a custom-built solar cell (not shown), for example a Solarex available from Farnell Electronics, may be used to assist triple charging of the battery 2.

If a user is not looking directly at the screen at the time the LED 60 is flashed there will be no reflection and the photodiode 61 will not activate. The microcontroller may therefore power down the back light 58 thus reducing the drain on the rechargeable battery 2.

Although the present invention has been described with reference to a particular implementation using accelerometers other position detection and location means may be used to implement movement detection arrangements. While herein references made to alphanumeric data it will be appreciated that katakana character and Cyrillic script inputs may also be detected using the acceleration method hereinbefore described.

Figure 9:
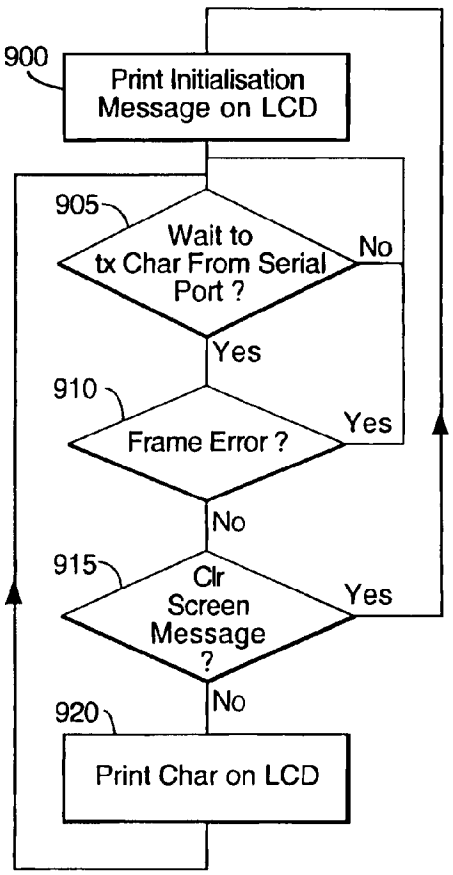

Note when the hand-held computer is docked with a PC or is receiving data by way of cellular or radio transmission it is possible to display received information on the screen 5. Thus as indicated at FIG. 9 an initialisation message is output to the screen 5 and an appropriate buffer is cleared. As characters are received at the serial port they are transferred to the microcontroller at 905 and checked for frame validity at 910. Assuming that there is no error at 910 and that the received character is not a clear screen message as indicated at 915 then a character is transferred to the LCD 5 for display at 920.

Further possible uses of the portable computer of the invention include storing large numbers of speech modes which when down loaded to a PC with the pen either in a docking station or by IRDA or radio transmission are sorted. In this process the PC converts the each of the speech notes to text and scans the text for frequently occurring words, for example "meeting" and then sorts the stored notes into sub-directories. Alternatively, notes may be sorted by date, subject matter or size as will occur with a normal windows file. Key control words such as "alarm" may result in the speech note being converted into a timed alarm which may then be written back to the portable computer so that at the appropriate time the portable computer either announces the alarm or a vibrate to alert the user, the alarm being displayed as a text message. It will be appreciated that if a sufficiently powerful microcontroller is used in the pen then the speech to text conversion may take place in the portable computer unit. A suitable vibrating motor for use as a silent alarm can be obtained from Murata of Japan. Situating the annunciator towards the barrel of the pen near the tip improves transmission.

The microcontroller may cause audio feedback of the current position of the stylus, for example by causing sounds of flicking pages when the pen is tilted forward or back.

While most emphasis herein has been on the display of alphanumeric, Katakana or Cyrillic characters, graphic information may also be viewed. For example, a file holding pictures related to a person may include three dimensional picture of that person's face. By revolving or tilting the computer the view may switch from a front view to a profile aspect. It will also be appreciated that an atlas may be stored in the data store and maps may be rotated to align with the direction of travel for example.

Additional functionality may be introduced to the hand-held computer by including a touch screen in front of the display screen such that a stylus can be used to select text or to cause localised movement of a cursor.

An autolocate function may be built into the microcontroller such that if no movement, ie no change in tilt of either the enclosed accelerometers occurs for a selectable period, probably 24 hours, the unit will sound an alarm at periodic intervals so that the user can locate it.

Note that the tilt sensors included herein measure tilt with respect to earth's gravity by use of a small beam arrangement. Other position sensors may be included. Global positioning by satellite is also a possible method of detecting a change in the position of the portable computer.

In a symbol counted mode it is possible for a user to flick the pen either as a tick or a cross, for example, in relation to a submitted document. The number of ticks or crosses may be counted and the result accumulated and transferred to data store or accumulated in a spreadsheet to which the user may input names, titles and the like. The use of other symbols in anticipated.

While as hereinbefore described the security signature is by use of acceleration, a pressure detector may be incorporated into the end of the device to further increase security by measurement of the profile as well as the two dimensional or three dimensional spatial sensor.

As has been mentioned hereinbefore, a number of keys, switches and buttons are provided on the casing of the portable computer. In a further implementation an on/off switch may be provided operated by pressure on the "nib-end". Whilst such switch pressure is not used for detecting input text per se, it may be used to turn functions on and off. This may be used in a normal writing mode, for example, touching the pen tip against a writing surface to turn on the accelerometer detection functions. Releasing pressure on the tip then stops the accelerometer signals being considered as potential input to be decoded.

Any of the other switches may be used in certain modes to turn on or off text detection, for example, or to stop screen scrolling for example.

Calculator functions in the portable computer may be provided simply by writing the numerals and appropriate mathematical symbols in the normal manner. The tilt sensor software will determine the numerals and characters entered and perform an appropriate calculation for display on the display screen.

A further function, for example for clock setting causes display of an analogue clock face on the display means 5. Time changes may be entered by selecting an appropriate mode and moving the user's wrist. Tilt sensing is used to determine forward or backward adjustment of the time stored.

What is claimed is:

[1. A portable computer comprising:

movement detection means responsive to movement of the computer to produce an electrical output signal representative of such movement, a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

wherein detected movement data is used to effect scrolling of displayed information such that portions of data defining alphanumeric or graphic information outside a currently displayed screen is selectable by the user, the scrolling of displayed information effectively displaying a part of an adjacent screen.]

[2. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

in which a relative lateral tilting movement causes the display of information stored as to one or other side of currently displayed information.]

[3. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

in which relative rolling movement causes the display of information stored as above or below currently displayed information.]

[4. A portable computer comprising:

movement detection means responsive to movement of the computer to produce an electrical output signal representative of such movement;

processing means responsive to the output of said movement detection means to determine detected movement data defining a user's intention;

the processing means using said data to provide a mode response selected from a multiplicity of stored possible modes; and wherein the processing means is responsive to detected movement data to determine a most likely orientation of a computer display means, the processing means causing the displayed information to be oriented accordingly.]

[5. A portable computer as in claim 4, in which a plurality of switch means responsive to user action is included adjacent to the display means, the respective function of each of the switch means being oriented to match the orientation of displayed information.]

[6. A portable computer as in claim 4 further comprising a touch sensitive static potentiometer strip responsive to movement of a user's finger to simulate movement of a potentiometer, the orientation of said potentiometer reflecting the orientation of the displayed information.]

[7. A portable computer comprising:

movement detection means responsive to movement of the computer to produce an electrical output signal representative of such movement;

processing means responsive to the output of said movement detection means to determine detected movement data defining a user's intention, the processing means using said data to provide a mode response selected from a multiplicity of stored possible modes; and proximity detection means which provides signals indicative of the proximity of a computer display screen to a user's view, the processing means being further responsive to changes in relative proximity to increase or decrease the density of displayed information.]

[8. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention; the processing means using said movement data to provide a mode response selected from a multiplicity of stored possible modes, at least some of which define selection for display of a further one of the pages from the multiplicity of pages, the further one of the pages being adjacent to a previously selected page being currently displayed;

radio transceiver means, the processing means being responsive to detected movement data which identifies another device to cause the transmission of coded signals including a message for display.]

[9. A portable computer as in claim 8 in which the processing means is responsive to received encoded radio signals to activate a paging alert.]

[10. A portable computer as in claim 9, in which the page alert comprises a tone.]

[11. A portable computer as in claim 9, in which the paging alert comprises an operation of a vibrating means.]

[12. A portable computer as in claim 8, in which the processing means causes the display of a message derived from the information received.]

[13. A portable computer comprising:

a casing for housing other components of the portable computer, the casing being shaped to facilitate a user holding the portable computer as a writing stylus; and a display screen;

wherein said casing includes a radiused triangular cross-section along a substantial portion of its length and a flattened section incorporating the display screen, and an angular shaping between a forward holding area adapted to rest in the user's fingers and rearward flattened area holding the display screen the shaping being such as to provide a natural viewing angle of the incorporated display screen while the casing is held as a writing stylus.]

[14. A portable computer as in claim 13, in which the shaping causes the rearward screen area to be supported by the dorsal areas of a user's hand.]

[15. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages being the further one of the pages being adjacent to a previously selected page being currently displayed;

wherein the processing means is responsive to detected movement data to determine a most likely orientation of the display, the processing means causing the displayed information to be oriented accordingly.]

[16. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

the processing means using said movement data to provide a mode response selected from a multiplicity of stored possible modes, at least some of which define selection for display of a further one of the pages from the multiplicity of pages, the further one of the pages being adjacent to a previously selected page being currently displayed;

in which a plurality of switch means responsive to user action is included adjacent to the display, the respective function of each of the switch means being oriented to match the orientation of displayed information.]

[17. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed;

processing means responsive to the output of said movement detection means to determine detected movement data defining a user's intention, the processing means using said movement data to provide a mode response selected from a multiplicity of stored possible modes, at least some of which define selection for display of a further one of the pages from the multiplicity of pages, the further one of the pages being adjacent to a previously selected page being currently displayed; and a touch sensitive static potentiometer strip responsive to movement of a users finger to simulate movement of a potentiometer, the orientation of said potentiometer reflecting the orientation of the displayed information.]

[18. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

wherein detected movement data is used to effect scrolling of displayed information such that portions of data defining alphanumeric or graphic information outside a currently displayed screen is selectable by the user, the scrolling of displayed information effectively displaying a part of an adjacent screen.]

[19. A portable computer as in claim 18, including a sound output device, the processing means being arranged to provide output of speech or other sound signals derived from stored data.]

[20. A portable computer as in claim 18, including radio transmission or infrared transmission means, the processing means being responsive to detected movement data to output to the transmission means signals representative of the detected movement.]

[21. A portable computer as in claim 18, including radio transmission or infrared transmission means, the processing means being responsive to detected movement data to output to the transmission means signals representative of alphanumeric characters.]

[22. A portable computer as in claim 18, in which the processing means stores data defining an authorised user's password, the processing means being locked in a secure mode until detected movement data corresponding to the security data is received.]

[23. A portable computer as in claim 18, further comprising a sound input device, the processing means being responsive to voice input signals from a user to derive alphanumeric data.]

[24. A portable computer as in claim 23, further including a sound output device in combination with a radio transceiver whereby cellular or radio telephony networks may be used.]

[25. A portable computer as in claim 18 housed in a casing shaped to facilitate a user holding the computer as a writing stylus.]

[26. A portable computer as in claim 25, in which the casing comprises a radiused triangular cross-section along a substantial portion of its length.]

[27. A portable computer as in claim 26, in which the casing includes a flattened section incorporating a display screen.]

[28. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

in which a relative lateral tilting movement causes the display of information stored as to one or other side of currently displayed information.]

[29. A portable computer as in claim 28 housed in a casing shaped to facilitate a user holding the computer as a writing stylus.]

[30. A portable computer as in claim 29, in which the casing comprises a radiused triangular cross-section along a substantial portion of its length.]

[31. A portable computer as in claim 30, in which the casing includes a flattened section incorporating a display screen.]

[32. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

in which relative rolling movement causes the display of information stored as above or below currently displayed information.]

[33. A portable computer as in claim 32 housed in a casing shaped to facilitate a user holding the computer as a writing stylus.]

[34. A portable computer as in claim 33, in which the casing comprises a radiused triangular cross-section along a substantial portion of its length.]

[35. A portable computer as in claim 34, in which the casing includes a flattened section incorporating a display screen.]

[36. A portable computer comprising:

movement detection means responsive to movement of the computer to produce an electrical output signal representative of such movement;

a storage medium for storing data defining a multiplicity of displayable pages each comprising of a plurality of lines;

a display having a corresponding plurality of lines to enable one of the multiplicity of pages to be displayed; and processing means responsive to the output of said movement detection means to determine detected movement data defining a user's intention;

wherein the processing means is responsive to detected movement data to determine a most likely orientation of the display, the processing means causing the displayed information to be oriented accordingly.]

*37. A hand held cellular telephone comprising:*

*a non clam shell case, which case can be held in one hand of a user; the case housing a cellular transceiver;*

*a tilt detector;*

*a screen that displays information, the screen mounted to the case;*

*a detector that detects a reflection from the user's eye to determine whether the user is looking directly at the screen and,*

*a processor configured to modify a functionality of the screen based on whether the user is looking at information on the screen, wherein the modification to the functionality of the screen comprises powering down the screen.*

*38. The cellular telephone of claim 37, wherein the screen comprises a touch screen.*

*39. The cellular telephone of claim 38, wherein the powering down the screen comprises powering down touch screen circuitry.*

*40. The cellular telephone of claim 37, wherein powering down the screen comprises switching backlighting between on and off.*

*41. The cellular telephone of claim 37, wherein the cellular telephone is configured for sending and receiving email messages.*

*42. The cellular telephone of claim 37, wherein the cellular telephone is configures for sending and receiving text messages.*

*43. The cellular telephone of claim 37, further comprising a casing shaped to facilitate the user holding the telephone in one hand.*

*44. The cellular telephone of claim 43, wherein the casing is sealed as to be waterproof.*

*45. The cellular telephone of claim 37, wherein the telephone is configured for receiving GPS data.*

*46. The cellular telephone of claim 37, futher comprising a movement detection means resonsive to movement of the telephone.*

*47. The cellular telephone of claim 46, wherein the movement detection means comprises a global positioning system (GPS).*

*48. The cellular telephone of claim 37, wherein the tilt detector comprises at least one accelerometer.*

*49. The cellular telephone of claim 37, wherein the tilt detector comprises at least two accelerometers.*

*50. The cellular telephone of claim 37, wherein the case is sized and shaped to be held between the root of the thumb and the index finger of the hand of the user.*

*51. The cellular telephone of claim 50, wherein the case further houses a rechargeable battery.*

*52. The cellular telephone of claim 51, further comprising a docking element.*

*53. The cellular telephone of claim 52, further comprising a speech recorder.*

*54. The cellular telephone of claim 49, further comprising software to permit the processor to determine the user's requirement for a different view on the screen.*

*55. The cellular telephone of claim 37, further comprising software to permit the processor to determine the user's requirement for a different view on the screen.*

*56. The cellular telephone of claim 37, further comprising a data store.*

*57. The cellular telephone of claim 37, configured to display maps on the screen.*

*58. The cellular telephone of claim 54, wherein the different view is portrait.*

*59. The cellular telephone of claim 55, wherein the different view is portrait.*

*60. The cellular telephone of claim 54, wherein the different view is selected from the group consisting of scrolling up, scrolling down, scrolling left and scrolling right.*

*61. The cellular telephone of claim 55, wherein the different view is selected from the group consisting of scrolling up, scrolling down, scrolling left and scrolling right.*

*62. The cellular telephone of claim 54, wherein the different view is selected from the group consisting of up and to the left (UL), up and to the right (UR), down and to the left (DL) and down and to the right (DR).*

*63. The cellular telephone of claim 55, wherein the different view is selected from the group consisting of up and to the left (UL), up and to the right (UR), down and to the left (DL) and down and to the right (DR).*

*64. The cellular telephone of claim 37, wherein the cellular telephone further comprises at least one selected from the group comprising a key and a switch to lock or unlock display movement on the screen.*

*65. The cellular telephone of claim 37, wherein the casing is hermetically sealed.*

*66. The cellular telephone of claim 37, further comprising a pressure detector.*

*67. The cellular telephone of claim 37, further comprising voice recognition software.*

* * * * *

UNITED STATES PATENT AND TRADEMARK OFFICE

CERTIFICATE OF CORRECTION

PATENT NO. : RE44,855 E
APPLICATION NO. : 13/188239
DATED : April 22, 2014
INVENTOR(S) : Williams It is certified that error appears in the above-identified patent and that said Letters Patent is hereby corrected as shown below:

In the claims:

Column 18, Claim 42, Line 53, please change “configures” to --configured--.

Signed and Sealed this
Twenty-fourth Day of March, 2015

Michelle K. Lee

Michelle K. Lee
*Director of the United States Patent and Trademark Office*